(12) United States Patent
Yoshimi et al.

(10) Patent No.: US 10,027,639 B2
(45) Date of Patent: *Jul. 17, 2018

(54) IC CHIP PERFORMING ACCESS CONTROL BASED ON ENCRYPTED ID

(71) Applicant: SONY CORPORATION, Tokyo (JP)

(72) Inventors: Hideo Yoshimi, Tokyo (JP); Katsuya Shimoji, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/717,916

(22) Filed: May 20, 2015

(65) Prior Publication Data
US 2015/0256524 A1 Sep. 10, 2015

Related U.S. Application Data

(63) Continuation of application No. 13/896,626, filed on May 17, 2013, now Pat. No. 9,065,635.

(30) Foreign Application Priority Data

May 30, 2012 (JP) ................. 2012-123045

(51) Int. Cl.
*H04L 29/06* (2006.01)
*H04L 9/08* (2006.01)
*H04L 9/12* (2006.01)

(52) U.S. Cl.
CPC .......... *H04L 63/061* (2013.01); *H04L 9/0816* (2013.01); *H04L 9/0866* (2013.01); *H04L 9/0869* (2013.01); *H04L 9/12* (2013.01); *H04L 2209/805* (2013.01)

(58) Field of Classification Search
CPC ... H04L 9/0816; H04L 9/0866; H04L 9/0869; H04L 9/12
See application file for complete search history.

(56) References Cited

U.S. PATENT DOCUMENTS

| | | | |
|---|---|---|---|
| 6,438,133 B1* | 8/2002 | Ervin | H04L 12/4625 370/403 |
| 2003/0221011 A1* | 11/2003 | Shitano | H04L 63/06 709/229 |
| 2008/0204278 A1* | 8/2008 | Tsuzuki | G07B 15/063 340/928 |
| 2009/0259850 A1* | 10/2009 | Ishibashi | H04L 9/3273 713/169 |
| 2011/0078455 A1* | 3/2011 | Zhu et al. | 713/182 |

* cited by examiner

*Primary Examiner* — Samson Lemma
*Assistant Examiner* — Arya Golriz
(74) *Attorney, Agent, or Firm* — Chip Law Group

(57) ABSTRACT

There is provided an information processing apparatus including an encrypted-ID generation section which encrypts a unique ID to generate an encrypted ID, the unique ID being set as an ID unique to the information processing apparatus, a communication section which sends the encrypted ID as ID information to be sent to another apparatus, an individualization code holding section which holds, in advance, an individualization code capable of being generated by decrypting the ID information in the other apparatus, and an access key generation section which generates an access key used for authentication with the other apparatus based on the individualization code held by the individualization code holding section.

11 Claims, 16 Drawing Sheets

FIG. 1
CASE WHERE KEYS ARE NOT INDIVIDUALIZED
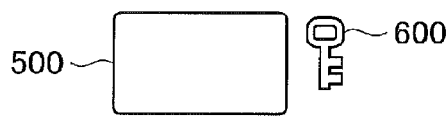
IF KEY OF ONE CARD IS LEAKED,
ALL OF CARDS ARE AFFECTED
→ ENTIRE SYSTEM COLLAPSES
FIG. 2
CASE WHERE KEYS ARE INDIVIDUALIZED
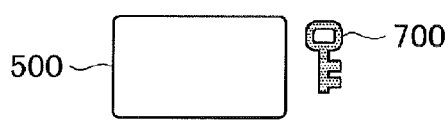
EVEN IF KEY OF ONE CARD IS LEAKED,
OTHER CARDS ARE NOT AFFECTED
→ REMEDY SUCH AS DISABLING ONE CARD CAN BE TAKEN

FIG. 3
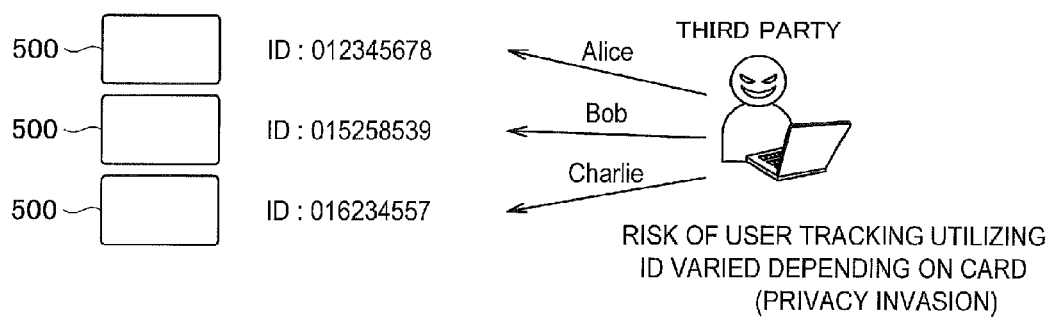
RISK OF USER TRACKING UTILIZING ID VARIED DEPENDING ON CARD (PRIVACY INVASION)
RANDOMIZED ID
ID PARTIALLY RANDOMIZED TO PREVENT USER TRACKING
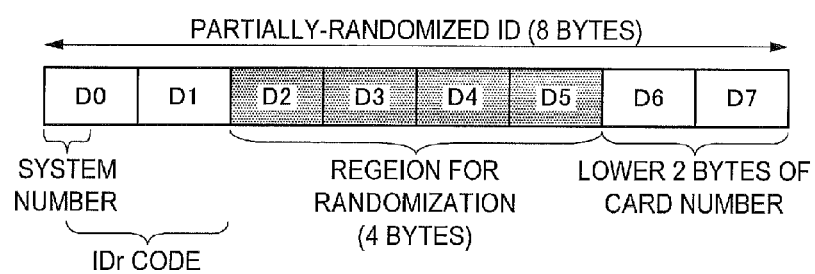

IC CHIP PERFORMING ACCESS CONTROL BASED ON ENCRYPTED ID

CROSS-REFERENCE TO RELATED APPLICATIONS

The present application is a continuation of U.S. patent application Ser. No. 13/896,626, filed on May 17, 2013 which claims priority from Japanese Patent Application No. 2012-123045, filed on May 30, 2012, all of which are incorporated herein by reference.

BACKGROUND

The present disclosure relates to an information apparatus, an IC chip, and an information processing method.

In the lated art, non-contact communication systems represented by Felica (registered trademark of SONY Corporation) are widely used.

Each non-contact communication system includes reader/writers (hereinafter, abbreviated as R/Ws) and non-contact communication IC cards (hereinafter, abbreviated as IC cards). In the non-contact communication system, communications are performed to exchange information between at least one of the R/Ws and the corresponding IC card in a non-contact manner by using electromagnetic waves. Before the communications for various types of information, a mutual authentication process is executed. In place of the IC card, a mobile phone or the like is sometimes used which has a built-in IC chip having the same function as the IC card.

For example, one IC card can have information on a plurality of services such as an electronic money service, a commutation ticket service for an electric train or the like, and an employee ID card service.

An access right or an access method for user data in the IC card is controlled in a service unit. For each service, a key for accessing user data exists, and is used to control the right of access to the user data for the service. In addition, for each service, an access method is specified according to a usage, such as use of a history data write method or an electronic money subtraction method.

To execute a history data write process electronic money subtraction process at a time, one key (a degeneration key) is generated from keys of a plurality of services. When the degenerate key is used, it is possible to access the plurality of services by performing the mutual authentication process one time. Nevertheless, when a key held for each service is used, it is also possible to individually access the service by performing a mutual authentication process.

However, to use a plurality of different services, that is, to access information on the services, it is necessary to perform a mutual authentication process varied depending on the service. Performing the mutual authentication processes using different keys for the respective services leads to strenuous processing. Hence, the following technology has been achieved by which one key (a degeneration key) is generated in advance based on the plurality of keys for the services, and the degeneration key is used for each of the mutual authentication processes used in the respective services. Then, in writing or reading information in each service, an encryption key (an access key) is generated from the degeneration key to perform a mutual authentication process.

Under these circumstances, as a method for generating an encryption key varied depending on the IC card, there is known a method as described in JP 2011-71758A which uses an individualization code generated based on a parameter (a card-specific ID) varied depending on the IC card.

SUMMARY

In JP 2011-71758A, an IC card notifies an R/W of the card-specific ID of the IC card, and the R/W generates an encryption key (an access key) In this case, the card-specific ID of the IC card might be leaked to a third party in the course of the notification. The card-specific ID of the IC card might be used for tracking or the like of behaviors of the user of the IC card. For example, the card-specific ID might even be abused to identify where and what the user purchases, and thus the privacy of the user might be invaded.

In this respect, JP 2011-71758A also describes a method by which a part of a card-specific ID is randomized to prevent the card-specific ID of the IC card from being leaked to a third party in the course of the notification to the R/W.

However, in this method, information usable for generating an individualization code is limited to information of a part which is not randomized in the card-specific ID. For this reason, the method has a disadvantage that another IC card having the same individualization code appears and thus an access key is prevented from being completely individualized depending on the IC card.

If a certain individualization code is suspected of being leaked, it is necessary to disable all the IC cards the same individualization code to stop the use thereof. The convenience of the users might be considerably impaired.

Further, in the method by which a part of a card-specific ID is randomized, the user might be identified based on card-specific ID information of a not randomized part.

Hence, there are demands for individualization of an access key and inhibition of leakage of a card-specific ID.

According to an embodiment of the present disclosure, there is provided an information processing apparatus including an encrypted-ID generation section which encrypts a unique ID to generate an encrypted ID, the unique ID being set as an ID unique to the information processing apparatus, a communication section which sends the encrypted ID as ID information to be sent to another apparatus, an individualization code holding section which holds, in advance, an individualization code capable of being generated by decrypting the ID information in the other apparatus, and an access key generation section which generates an access key used for authentication with the other apparatus based on the individualization code held by the individualization code holding section.

The encrypted-ID generation section may encrypt the unique ID by using a seed value varying depending on the encrypted ID to be generated.

The encrypted-ID generation section may generate the encrypted ID based on the unique ID and encryption data generated based on an encryption key.

The encrypted-ID generation section may generate the encryption data based on the encryption key and a seed value varying depending on the encrypted ID to be generated.

The communication section may send, to the other apparatus, the encrypted ID and the seed value obtained when the encrypted ID is generated.

The information processing apparatus may further include a randomized ID generation section which randomizes at least a part of the unique ID to generate a randomized ID. The communication section may send the randomized ID as the ID information to the other apparatus.

The information processing apparatus may further include a flag holding section. One of the encrypted ID and the randomized ID may be generated based on a flag held by the flag holding section.

The information processing apparatus may further include a manipulation randomized input which receives a manipulation input. One of the encrypted ID and the randomized ID may be generated based on the manipulation input.

The encrypted-ID generation section may generate the encrypted ID at timing at which communication with the other apparatus is started.

The encrypted-ID generation section may generate the encrypted ID in response to an instruction from the other apparatus. The information processing apparatus may include a storage section which stores the generated encrypted ID.

The encryption key may be individualized to correspond to at least a part of the unique ID. The communication section may send the part of the unique ID to the other apparatus in a manner that the other apparatus generates the individualized encryption key.

According to an embodiment of the present disclosure, there is provided an IC chip including an encrypted-ID generation section which encrypts a unique ID to generate an encrypted ID, the unique ID being set as an ID unique to the information processing apparatus, a communication section which sends the encrypted ID as ID information to be sent to another apparatus, an individualization code holding section which holds, in advance, an individualization code capable of being generated by decrypting the ID information in the other apparatus, and an access key generation section which generates an access key used for authentication with the other apparatus based on the individualization code held by the individualization code holding section.

The encrypted-ID generation section may encrypt the unique ID by using a seed value varying depending on the encrypted ID to be generated.

The encrypted-ID generation section may generate the encrypted ID by using an exclusive OR of encryption data generated based on an encryption key and the unique ID.

The encrypted-ID generation section may generate the encryption data based on the encryption key and a seed value varying depending on the encrypted ID to be generated.

The communication section may send, to the other apparatus, the encrypted ID and the seed value obtained when the encrypted ID is generated.

The IC chip may further include a randomized ID generation section which randomizes at least a part of the unique ID to generate a randomized ID. The communication section may send the randomized ID as the ID information to the other apparatus.

The IC chip may further include a flag holding section. One of the encrypted ID and the randomized ID may be generated based on a flag held by the flag holding section.

The encryption key may be individualized to correspond to at least a part of the unique ID. The communication section may send the part of the unique ID to the other apparatus in a manner that the other apparatus generates the individualized encryption key.

According to an embodiment of the present disclosure, there is provided an information processing method including encrypting a unique ID to generate an encrypted ID, the unique ID being set as an ID unique to the information processing apparatus, sending the encrypted ID as ID information to be sent to another apparatus, and generating an access key used for authentication with the other apparatus based on an individualization code capable of being generated by decrypting the ID information in the other apparatus.

Furthermore, according to an embodiment of the present disclosure, there is provided an information processing apparatus including a communication section which sends a response request to another apparatus and receives an encrypted ID generated by the other apparatus based on a unique ID set as an ID unique to the other apparatus, an individualization code generation section which generates an individualization code by decrypting the encrypted ID, the individualization code being held by the other apparatus, and an access key generation section which generates an access key used for authentication with the other apparatus based on the individualization code.

Furthermore, according to an embodiment of the present disclosure, there is provided an information processing method including sending a response request to another apparatus and receiving an encrypted ID generated by the other apparatus based on a unique ID set as an ID unique to the other apparatus, generating an individualization code by decrypting the encrypted ID, the individualization code being held by the other apparatus, and generating an access key used for authentication with the other apparatus based on the individualization code.

Furthermore, according to an embodiment of the present disclosure, there is provided a program causing a computer to function as means for sending a response request to another apparatus and receives an encrypted ID generated by the other apparatus based on a unique ID set as an ID unique to the other apparatus, means for generating an individualization code by decrypting the encrypted ID, the individualization code being held by the other apparatus, and means for generating an access key used for authentication with the other apparatus based on the individualization code.

According to the embodiments of the present disclosure described above, it is possible to individualize an access key and inhibit leakage of a unique ID.

BRIEF DESCRIPTION OF THE DRAWINGS

FIG. 1 is a schematic diagram illustrating a case where an encryption key common to all of the IC cards is registered;

FIG. 2 is a schematic diagram illustrating a case where different encryption keys for respective IC cards are registered;

FIG. 3 is a schematic diagram illustrating a method of randomizing a part of a card-specific ID;

DETAILED DESCRIPTION OF THE EMBODIMENTS

Figure 4:
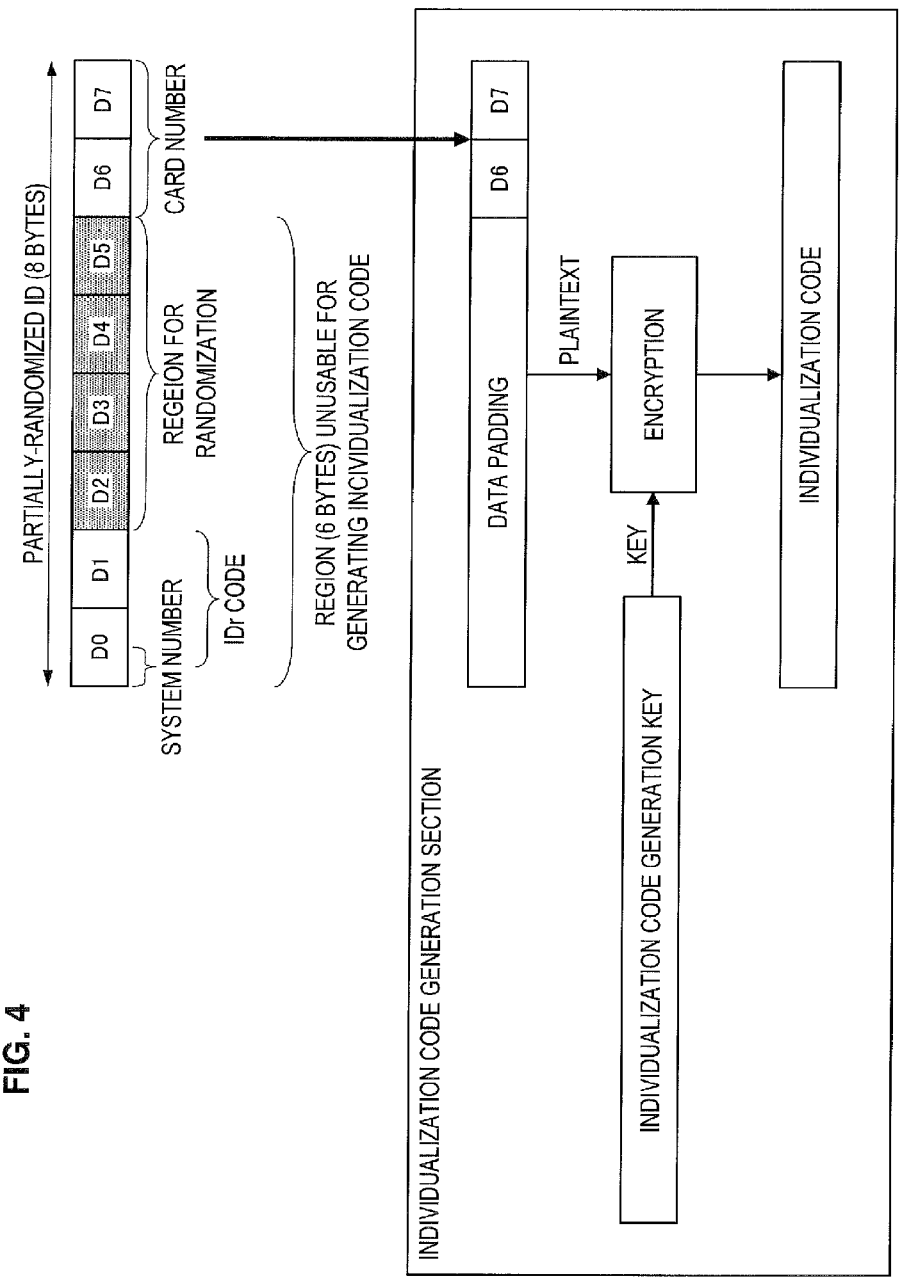
FIG. 4 is a schematic diagram illustrating a processing of generating an individualization code by adding data padding to 2 bytes (D6 and D7) which are not randomized and then by encrypting the 2 bytes by using an individualization code generation key.

Hereinafter, preferred embodiments of the present disclosure will be described in detail with reference to the appended drawings. Note that, in this specification and the appended drawings, the same function structural elements that have substantially and structure are denoted with the same reference numerals, and repeated explanation of these structural elements is omitted.

Note that the descriptions will be given in the following order.

1. First Embodiment
1.1. Technology as premise of embodiments of present disclosure embodiment
1.2. Outline of first embodiment
1.3. Specific configuration example of first embodiment
1.4. Generation of partially-randomized ID and encrypted ID
1.5. Individualization of degeneration key
1.6. Processing by ID decryption section
1.7. Operation of non-contact communication system
1.8. Operation of ID card
1.9. Operation of R/W
2. Second Embodiment
2.1. Outline of second embodiment
2.2. Processing by encrypted-ID generation section
2.3. Processing by ID decryption section of R/W
2.4. Data structure of encrypted ID used in second embodiment

1. First Embodiment

[1.1. Technology as Premise of Embodiments of Present Disclosure]

Firstly, a description is given of a technology as premise of embodiments of present disclosure. FIG. 1 illustrates a case where an encryption key (an access key) 600 common to all of the IC cards 500 is registered. In this case as in FIG. 1 where the encryption key 600 common to all of the IC cards 500 is registered, when a certain one of the IC cards 500 is physically or logically analyzed by an attacker and the encryption key 600 thereof is leaked, the other IC cards 500 using the encryption key 600 are also affected, and the entire system including the electronic money and the like using the IC cards 500 faces a risk.

In contrast, FIG. 2 illustrates a case where different encryption keys (access keys) 700 for the respective IC cards 500 are registered. By registering the different encryption keys 700 for the respective IC cards 500 as shown in FIG. 2, the security can be enhanced. Here, setting the different encryption keys for the respective IC cards 500 is referred to as individualization of the encryption keys 700. In this case, even if the encryption key 700 of one of the IC cards 500 is leaked, the encryption key 700 is not allowed to be used for authenticating any other IC cards 500. Accordingly, the other IC cards 500 are not affected. Moreover, when the leakage of the encryption key 700 is detected, the IC card 500 having the leaked encryption key 700 is disabled to stop the use thereof. Thus, it is possible to take an appropriate remedy and to avoid the risk the entire system might face.

As a method of generating the different encryption keys 700 for the respective IC cards 500, JP 2011-71758A describes the method by which the individualization codes generated based on the different parameters (the card-specific IDs) for the respective IC cards are used. In this case, however, it is necessary that each IC card 500 notify the R/W of its card-specific ID. Accordingly, the card-specific ID of the IC card 500 might be leaked to a third party in the course of the notification. The card-specific ID of the IC card 500 might be utilized for tracking and the like of a behavior of the user of the IC card 500. For example, the card-specific ID might be abused to identify where and which the user purchases, and thus the privacy of the user might be invaded.

In this respect, JP 2011-71758A discloses the method of randomizing a part of a card-specific ID to prevent the user privacy invasion, as shown in FIG. 3. The method can avoid the leakage of the card-specific ID of the IC card 500 to the third party in the course of the notification to the R/W, because the 8-byte card-specific ID with its part randomized is transmitted to the R/W.

As described above, to enhance the security of the IC cards 500, there is a demand for achieving both two requirements of individualization of the encryption keys and user privacy protection.

However, the two requirements have a trade-off relationship and are difficult to fulfill at the same time. In the method by which a part of a card-specific ID is randomized for the privacy protection, the following harmful effect is assumed. In this method, information usable for generating an individualization code is limited to information of a part which is not randomized in the card-specific ID. FIG. 4 illustrates processing of generating an individualization code by adding data padding to 2 bytes (D6 and D7) which are not randomized and then by encrypting the 2 bytes by using an individualization code generation key. Since the method illustrated in FIG. 4 uses lower digits (2 bytes) of the card number to generate the individualization code, IC cards having the same individualization code appear. For example, when 4 bytes out of 6 bytes of the card number which is the card-specific ID are randomized, only 2 bytes (=16 bits) are used for generating the individualization code, and there is one in 65536 chance (1/(2 to the sixteenth power)) that IC cards having the same individualization code exist. This means that, on the assumption that 40 million users use a certain service, there exist 610 IC cards having the same individualization code. If the individualization code of one of the IC cards is suspected of being leaked, it is necessary to disable the 610 IC cards to stop the use thereof. The convenience of the users might be considerably impaired.

Moreover, the method by which a part of a card-specific ID is randomized has a possibility that the user of the card-specific ID is identified based on information of a part which is not randomized. In this case, even though use of only the information of the not randomized part of the card-specific ID might enable only narrow down to several tens of thousands of users, the tracking target user might be identified by further narrowing down the users based on information on an area where the user lives and a time zone in which the user uses the ID card. For example, when an attacker has basic information that a tracking target user lives in Ibaraki Prefecture and uses his/her IC card mainly at night, further attacker might narrow down might be possible, and thus the attacker might be able to perfectly track behaviors of the user. Hence, according to the present embodiment, the individualization of keys is perfectly achieved, while user tracking based on a card-specific ID of an IC card of the user is inhibited.

[1.2. Outline of Present Embodiment]

An outline of the present embodiment will be described as a premise of a description of a specific configuration of the present embodiment. The present embodiment has the following characteristics in the individualization of the encryption keys and the user privacy protection.

Figure 5:
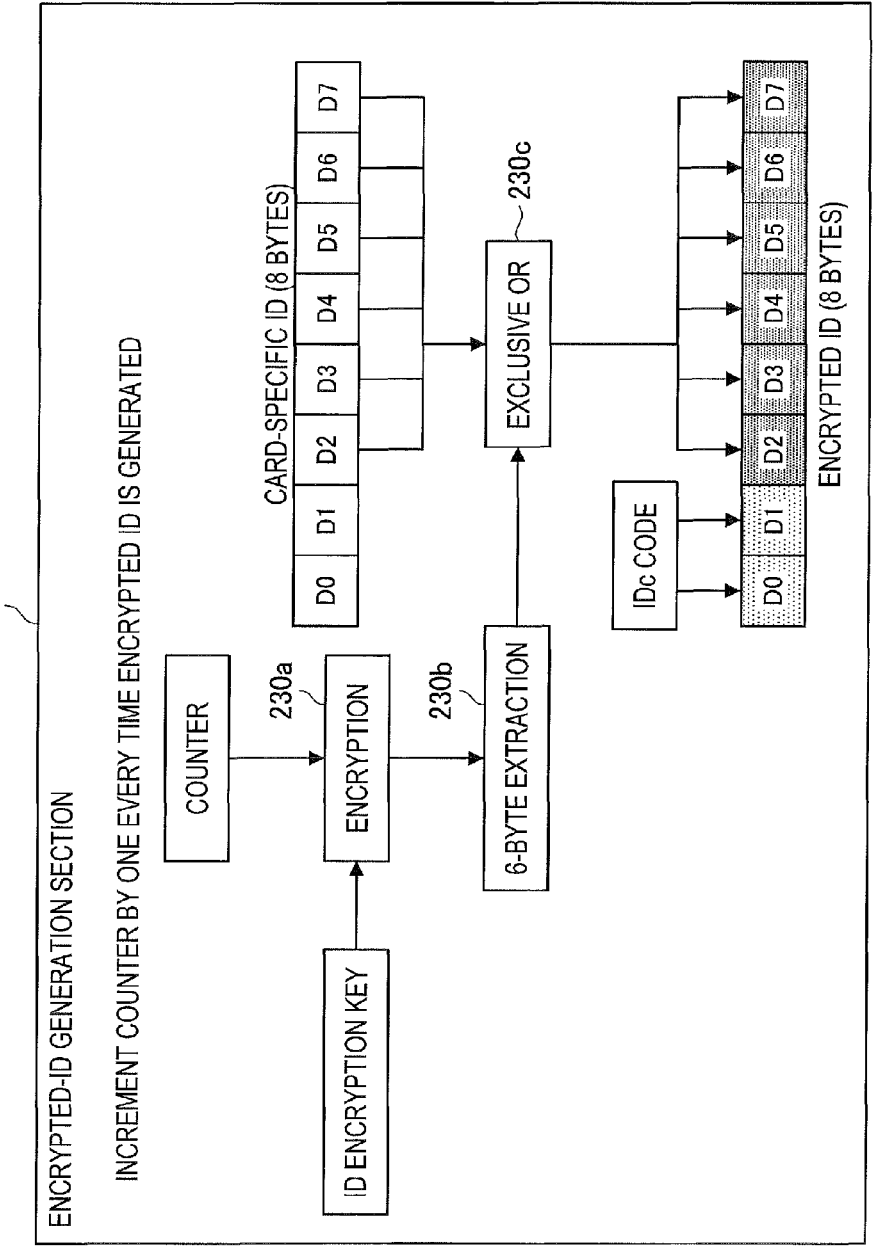
FIG. 5 a schematic diagram illustrating processing performed by an encrypted-ID generation section.

As shown in FIG. 5, generation of a random encrypted ID is achieved not by randomizing and updating a part of a card-specific ID but by encrypting and updating the card-specific ID. Then, the encrypted ID thus generated is transmitted to an R/W.

Since an unauthorized attacker completely sees the encrypted ID as a random number, it is not possible to track a user of a target IC card based on the encrypted ID.

On the other hand, an authorized service provider can decrypt the encrypted ID and perfectly achieve restoration to an original card-specific ID. Thereby, a completely different individualization code for each IC card can be generated by using the entire card-specific ID, instead of a part of the card-specific ID. When the individualization code of a certain one of the IC cards is suspected of being leaked, the one IC card only has to be disabled, and the other IC cards are not affected.

As described above, it is possible to not only limit affection of leakage of an encryption key of an IC card to the IC card but also achieve the privacy protection. Hereinbelow, the present embodiment will be described in detail.

[1.3. Specific Configuration Example of First Embodiment]

Figure 6:
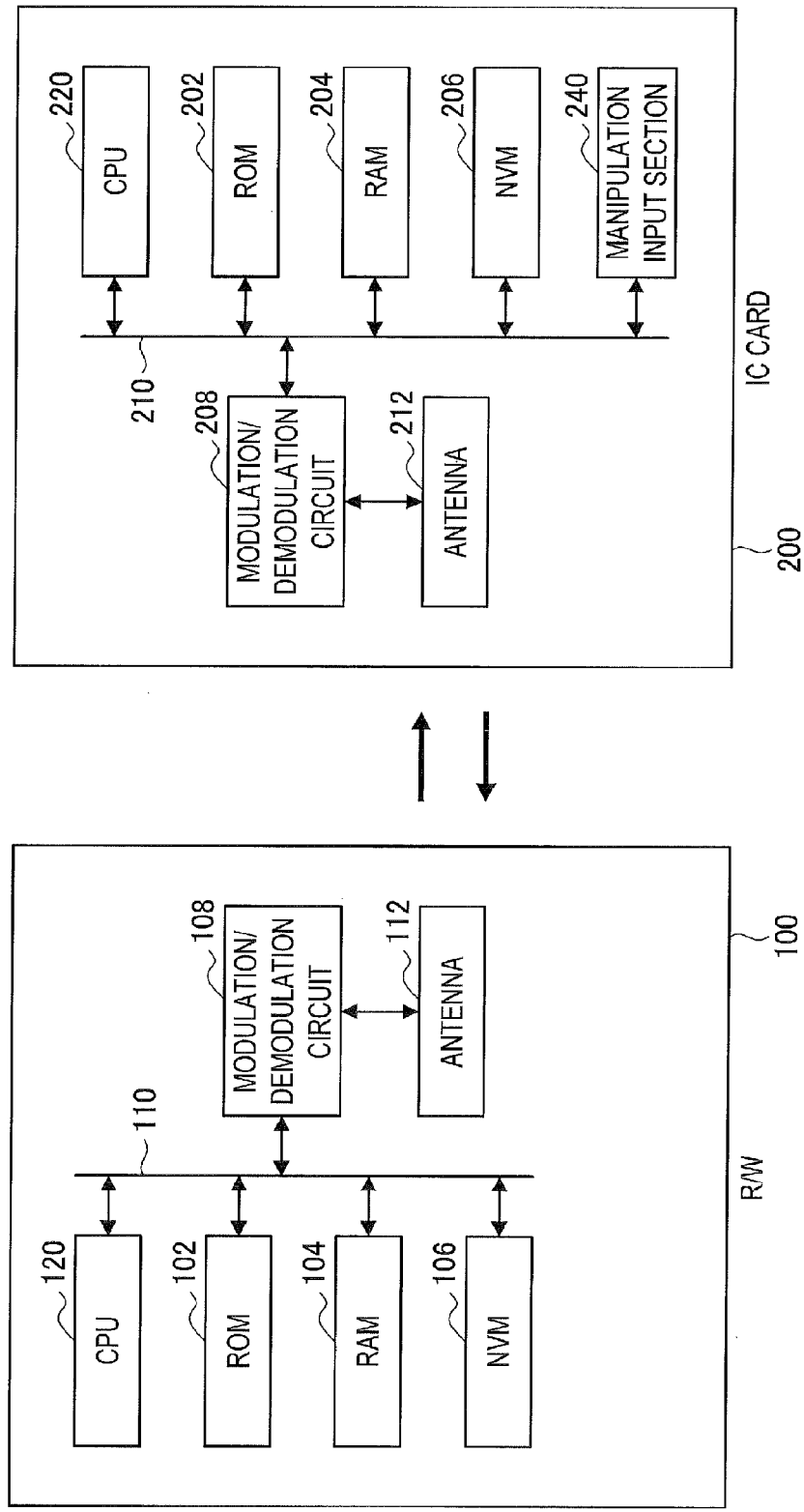
FIG. 6 is a schematic diagram illustrating a system configuration example of a first embodiment.

In the first embodiment, a description is given of a standard method used in the present disclosure. FIG. 6 is a schematic diagram illustrating a system configuration example in the first embodiment in the present disclosure. The system includes R/Ws (reader/writers) 100 and IC cards 200. Each IC card 200 is designed to generate a driving power inside the IC card 200 when a user locates the IC card 200 near one of the R/Ws 100. The IC card 200 is an example of an information processing apparatus according to the embodiment of the present disclosure. The information processing apparatus according to the embodiment of the present disclosure may be a mobile phone or a similar device.

The R/W 100 has a built-in CPU 120. A ROM 102, a RAM 104, a NVM (a non-volatile memory) 106, and a modulation/demodulation circuit 108 are connected to the CPU 120 via a bus 110. The CPU 120 controls sections of the R/W 100 by executing a control program stored in advance in the ROM 102. The RAM 104 is used as a memory for a work area used when the CPU 120 performs various processes. The NVM 106 holds a degeneration key. The modulation/demodulation circuit 108 modulates a carrier based on information to be used for transmitting the carrier to the IC card 200 and outputs the modulated carrier to an antenna 112, the information being outputted from the CPU 120 and input to the modulation/demodulation circuit 108 via the bus 110. The modulation/demodulation circuit 108 also demodulates a carrier received by the antenna 112 and outputs thus obtained information which is transmitted from the IC card 200, to the CPU 120 via the bus 110.

The IC card 200 has a built-in CPU 220. A ROM 202, a RAM 204, a NVM 206, a modulation/demodulation circuit 208, and a manipulation input section 240 are connected to the CPU 220 via a bus 210. The CPU 220 controls sections of the IC card 200 by executing a control program stored in advance in the ROM 202. The RAM 204 is used as a memory for a work area used when the CPU 220 performs various processes. The NVM 206 stores the degeneration key and information on various services (for example, the electronic money service, the commutation ticket service for an electric train or the like, and the employee ID card service) in layers for the respective services.

Figure 7:
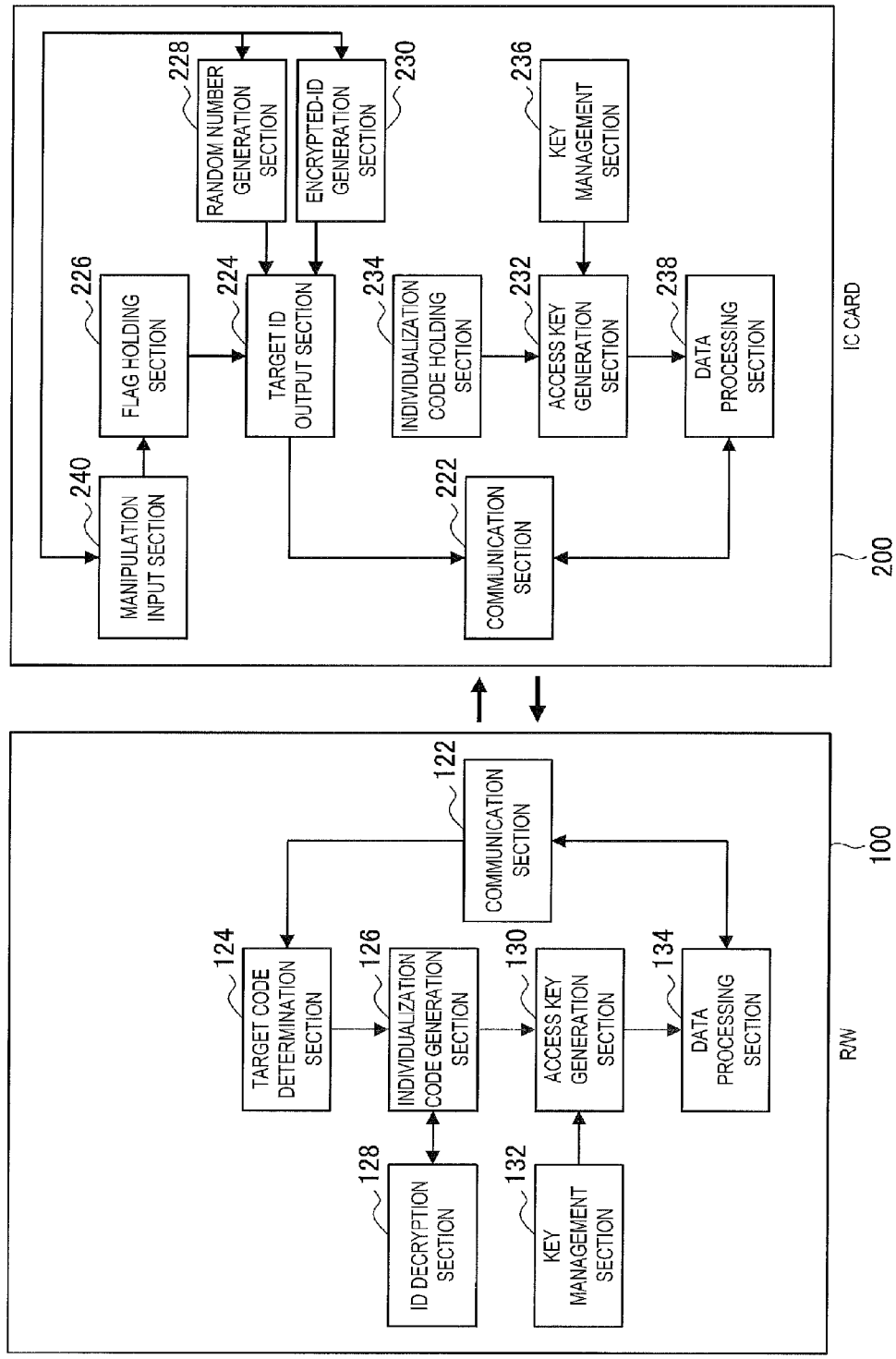
FIG. 7 is a diagram of functional blocks implemented by control programs respectively executed by a CPU of an R/W and a CPU of an IC card.

FIG. 7 illustrates a diagram of functional blocks implemented by the control programs respectively executed by the CPU 120 of the R/W 100 and the CPU 220 of the IC card 200.

In the R/W 100, a communication section 122, a target code determination section 124, an individualization code generation section 126, an ID decryption section 128, an access key generation section 130, a key management section 132, and a data processing section 134 are implemented by the control program executed by the CPU 120.

The communication section 122 controls communications with the IC card 200. The target code determination section 124 reads a target code of a target ID notified from the IC card 200 and determines whether the target ID is a card-specific ID, a partially-randomized ID, or an encrypted ID.

Based on the result of the determination by the target code determination section 124, the individualization code generation section 126 generates an individualization code for the IC card 200 by utilizing the card number. Note that the generation of the individualization code will be described later with reference to FIG. 10.

The ID decryption section 128 decrypts an encrypted ID in response to a request from the individualization code generation section 126 and outputs a card number resulting from the decryption. The processing of decrypting the encrypted ID will be described later with reference to FIG. 14.

The access key generation section 130 generates an access key by individualizing the degeneration key based on the result of the determination by the target code determination section 124. Note that the individualization of the degeneration key will be described later with reference to FIG. 9.

The key management section 132 manages the degeneration key held in advance and the generated access key. The data processing section 134 performs a mutual authentication process with the IC card 200 through the communication section 122 by using the generated access key. After the mutual authentication process, the data processing section 134 decrypts encrypted information which is transmitted from the IC card 200 and encrypts information to be transmitted to the IC card 200.

In the IC card 200, a communication section 222, a target ID output section 224, a flag holding section 226, a random number generation section 228, an encrypted-ID generation section 230, an access key generation section 232, an individualization code holding section 234, a key management section 236, and a data processing section 238 are implemented by the control program executed by the CPU 120. Note that when the information processing apparatus according to the embodiment of the present disclosure is a mobile phone or a similar device, an IC chip included in the information processing apparatus has the same components as the functional blocks of the IC card 200 in FIG. 7.

The communication section 222 controls communications with the R/W 100. Depending on a status of a flag held by the flag holding section 226, the target ID output section 224 outputs, as a target ID, a card-specific ID, a partially-randomized ID generated by replacing the card-specific ID with a random number or the like, or an encrypted ID obtained by encrypting the card-specific ID. Note that the card-specific ID is stored in advance in the NVM 206. The partially-randomized ID is generated by the target ID output section 224 at predetermined timing and is stored in the NVM 206. The generation of the partially-randomized ID will be described later with reference to FIG. 8B. The encrypted ID is generated by the target ID output section 224 at predetermined timing and is stored in the NVM 206.

The flag holding section 226 sets in advance a target ID determination flag indicating which one of the not processed card-specific ID, the partially-randomized ID, and the encrypted ID is to be used as the target ID. Hereinafter, when the card-specific ID indicated by the target ID determination flag is valid, the card-specific ID is used without special processing. When the partially-randomized ID is valid, the partially-randomized ID is used. When the encrypted ID is valid, the encrypted ID is used.

In other words, before the IC card 200 is delivered to a user, it is determined whether the card-specific ID subjected to no processing, the partially-randomized ID, or the encrypted ID is used as the target ID which is to be notified to the R/W 100. However, the status of the target ID determination flag held in the flag holding section 226 can be changed in response to a predetermined command from the R/W 100. Thus, for example, the setting of the target ID determination flag can be changed in the following manner. Before the R/Ws 100 according to the embodiment of the present disclosure are widely used in the society, the card-specific ID or the partially-randomized ID is notified as the target ID. After existing R/Ws go out of use and the R/Ws 100 are widely used, the encrypted ID is notified as the target ID.

The target ID determination flag status held in the flag holding section 226 can also be changed by user input through the manipulation input section 240. Thus, the user can appropriately set the card-specific ID subjected to no processing, the partially-randomized ID, or the encrypted ID which is to be used as the target ID.

The random number generation section 228 generates a random number in response to a request from the target ID output section 224. The encrypted-ID generation section 230 encrypts the card-specific ID in response to a request from the target ID output section 224 and outputs the encrypted ID.

FIG. 5 is a schematic diagram illustrating processing performed by the encrypted-ID generation section 230. As shown in FIG. 5, the encrypted-ID generation section 230a of the encrypted-ID generation section 230 encrypts a counter value which is a plaintext by using an ID encryption key, Here, the counter value is incremented by 1 every time an encrypted ID is generated. Encryption algorithm such as AES or DES is applicable to the encryption. Them, 6 bytes of the encryption result are extracted, and an exclusive OR of the extracted 6 bytes and lower 6 bytes of the card-specific ID is calculated by the exclusive OR section 230c.

The result of the calculation is set in D2 to D7 in the encrypted ID. Then, the system number and an IDc code which takes on a predetermined value are substituted in D0 and D1 of the encrypted ID, so that an encrypted ID update process is completed.

The individualization code holding section 234 manages the individualization code registered in advance for the IC card 200. The access key generation section 232 generates an access key by individualizing the degeneration key based on a target code of a target ID generated at the predetermined timing. The key management section 236 manages the degeneration key held in advance in the NVM 206. Note that the individualization of the degeneration key will be described later with references to FIG. 9.

The data processing section 238 performs a mutual authentication process with the R/W 100 through the communication section 222 by using the generated access key. After the mutual authentication process, the data processing section 238 decrypts encrypted information which is transmitted by the R/W 100 or encrypts information to be transmitted to the R/W 100.

Note that the functional blocks illustrated in FIG. 7 may be implemented by software as described above, and may be installed as hardware.

[1.4. Generation of Partially-Randomized ID and Encrypted ID]

FIG. 8A to 8D are diagrams each illustrating a course in which the target ID output section 224 of the IC card 200 generates a target ID.

Figure 8A:
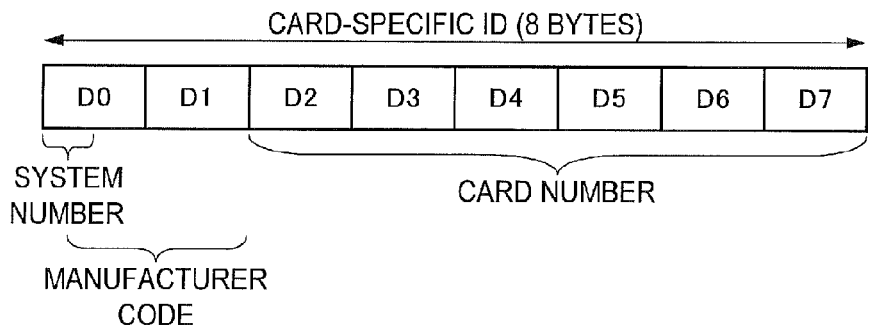
FIG. 8A is a diagram illustrating a course in which a target ID output section of the IC card generates a target ID.

FIG. 8A illustrates a data structure of a card-specific ID which is assigned to the IC card 200 in advance and stored in the NVM 206 or the like. The card-specific ID has an information amount of, for example, 8 bytes allotted to D0 to D7. A 4-bit system number, a 12-bit manufacturer code, and a 6-byte card number are recorded therein in this order from the MSB (Most Significant Bit) (from the left-most bit in FIG. 8A). The IC cards 200 manufactured by the same manufacture have the same system number and the same manufacturer code, but have different card numbers for the respective IC cards 200. Accordingly, in each IC card 200, the 6-byte card number D2 to D7 is substantially unique information.

Figure 8B:
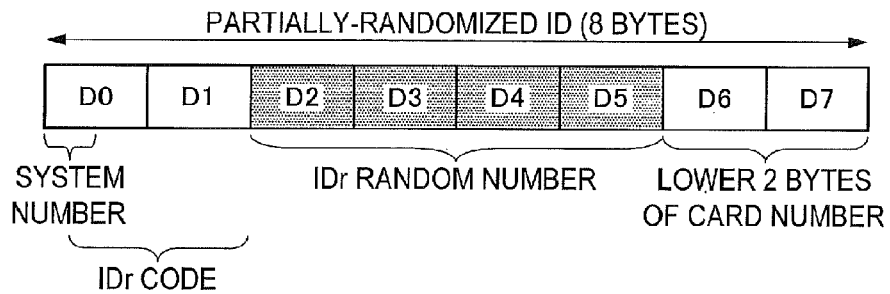
FIG. 8B is a diagram illustrating a course in which the target ID output section of the IC card generate a target ID.

FIG. 8B illustrates a data structure of a partially-randomized ID generated by the target ID output section 224. That is, in the partially-randomized ID, the manufacturer code in the card-specific ID is replaced with an IDr code of a predetermined value, and values of predetermined n bytes (4 bytes in FIG. 8B) on the MSB side of the 6-byte card number are replaced with a random number generated by the random number generation section 228. Here, n is an integer which is equal to or more than 1 and less than 6.

Figure 8C:
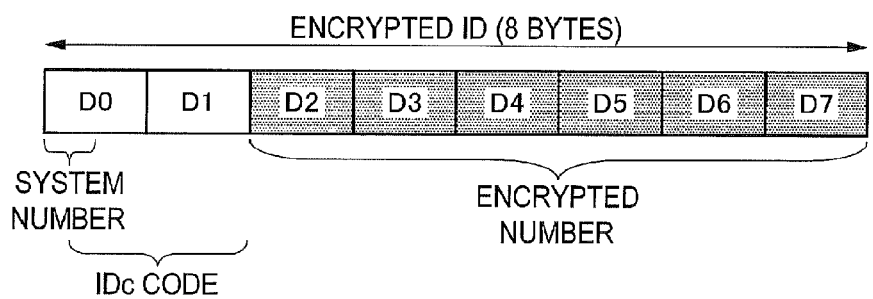
FIG. 8C is a diagram illustrating a course in which the target ID output section of the IC card generate a target ID.
Figure 8D:
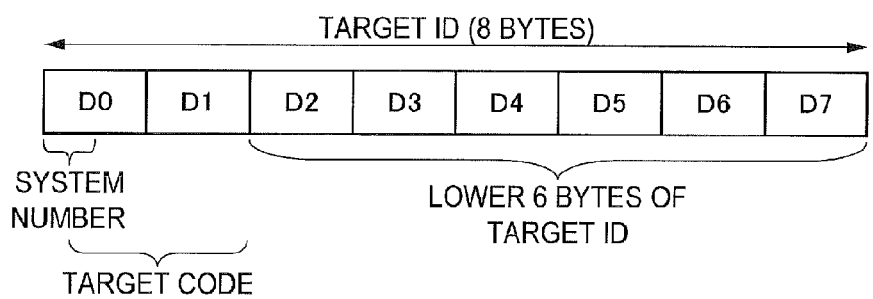
FIG. 8D is a diagram illustrating a course in which the target ID output section of the IC card generate a target ID.

FIG. 8C illustrates a data structure of an encrypted ID outputted by the target ID output section 224. As described above, the encrypted-ID generation section 230 encrypts the card-specific ID in response to the request from the target ID output section 224 and outputs the encrypted ID to the target ID output section 224. In the encrypted ID, the manufacturer code in the card-specific ID is replaced with an IDc code of a predetermined value, and D2 to D7 of the 6-byte card number are all encrypted.

Figure 12:
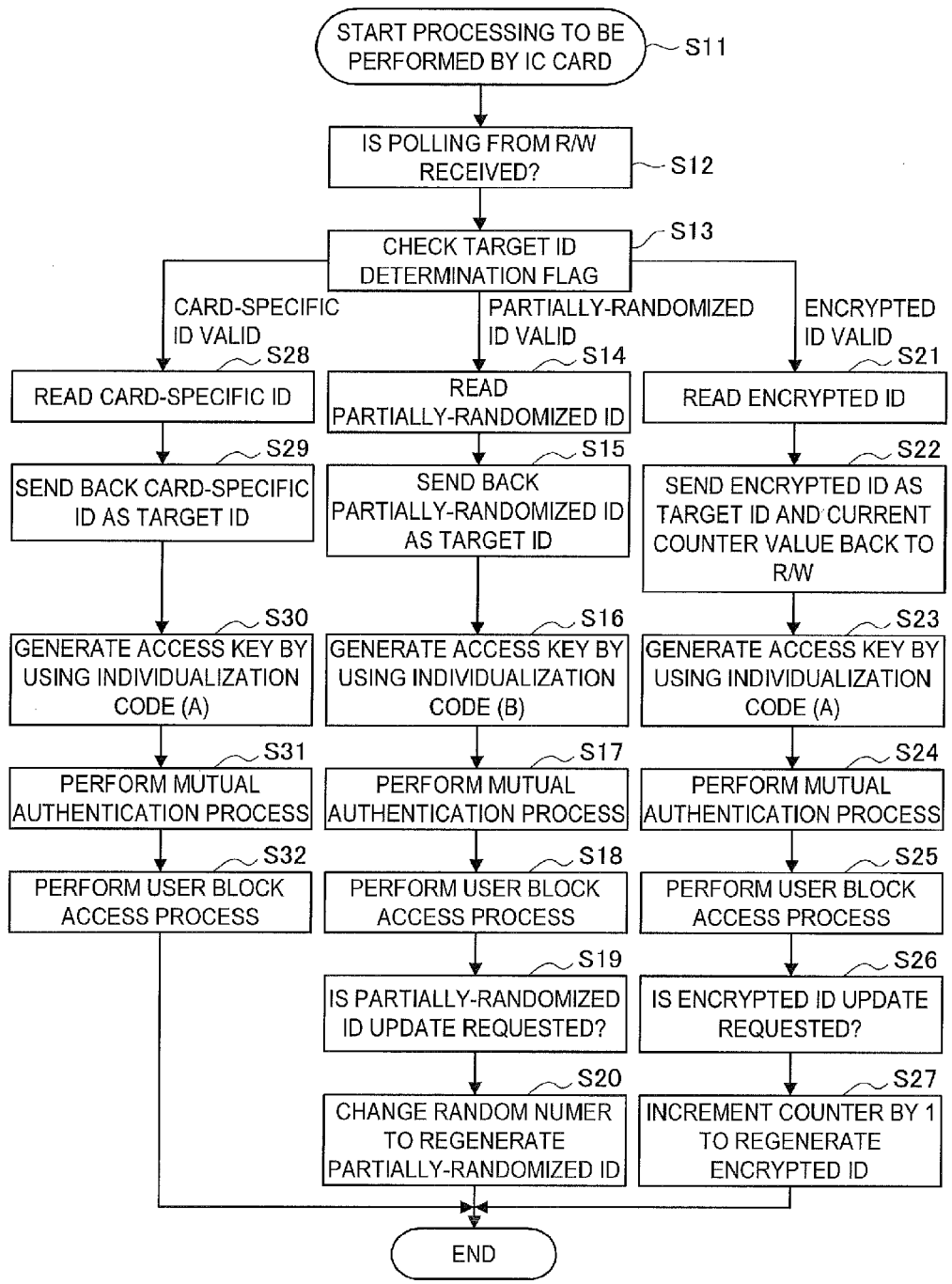
FIG. 12 is a flowchart illustrating processing performed by the IC card.

As shown in FIG. 8, the card-specific ID, the partially-randomized ID, and the encrypted ID are collectively referred to as a target ID. Note that as shown in FIG. 8D, 12 bits following the system number is hereinafter referred to as a target code, and 6 bytes of D2 to D7 is referred to as lower 6 bytes of a target ID.

When the IC card 200 notifies the R/W 100 of the card-specific ID in FIG. 8A, the partially-randomized ID in FIG. 8B, or the encrypted ID in FIG. 8C as a target ID, the 12 bits following the system number includes information indicating whether the target ID is the card-specific ID, the partially-randomized ID, or the encrypted ID. Thus, the R/W 100 can determine whether the target ID is the card-specific ID, the partially-randomized ID, or the encrypted ID based on the 12 bits following the system number.

[1.5. Individualization of Degeneration Key]

Figure 9:
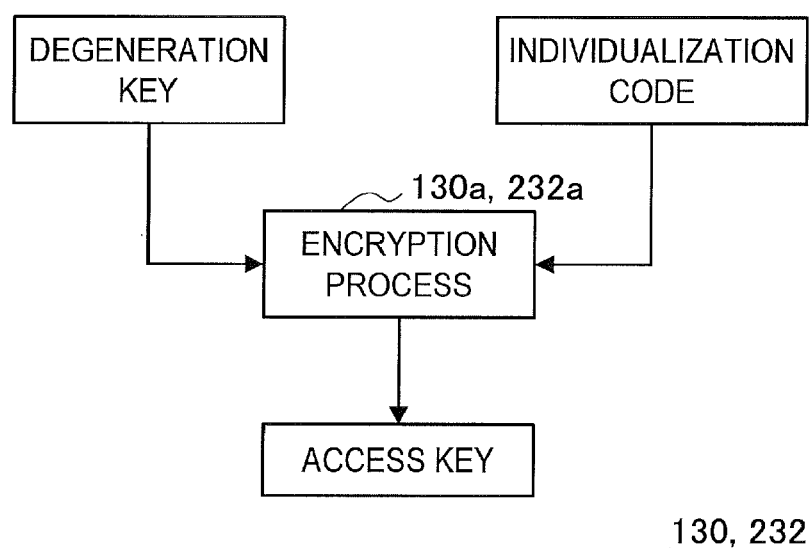
FIG. 9 is a diagram illustrating individualization of a degeneration key.

FIG. 9 is a diagram illustrating individualization of a degeneration key. The individualization of the degeneration key is performed by each of the access key generation section 130 of the R/W 100 and the access key generation section 232 generation section 130 and the access key generation section 232 include encryption processing sections 103*a* and 232*a*, respectively.

As shown in FIG. 9, in individualizing the degeneration key, an encryption process is performed by each of the encryption processing sections 103*a* and 232*a* by applying the individualization code to the degeneration key. For example, the individualization of the degeneration key is executed by adding the individualization code to the degeneration key. Hereinafter, the individualized degeneration key thus obtained by the individualization process is referred to as an access key.

Figure 10:
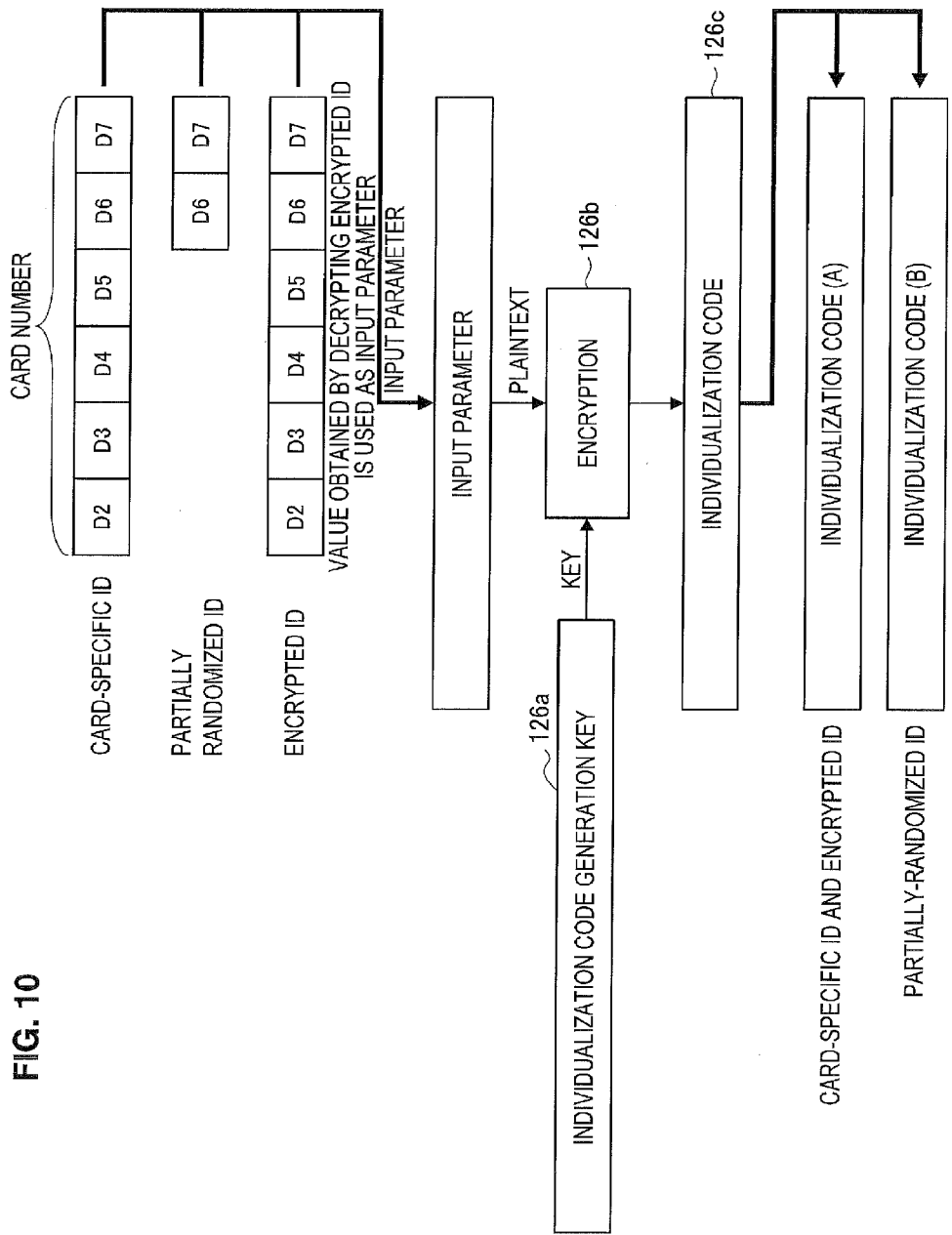
FIG. 10 is a schematic diagrams illustrating processing performed by an individualization code generation section.

Here, an individualization code is generated by using an input parameter input to the individualization code generation section 126. The input parameter is lower 6 bytes of the card-specific ID, the partially-randomized ID, or the decrypted encrypted ID, the IDs being transmitted from the IC card 200. FIG. 10 illustrates processing performed by the individualization code generation section 126. When the target ID is the card-specific ID, the entire card number of the target ID, that is, 6 bytes are used as the input parameter for the individualization code. In addition, when the target ID is the partially-randomized ID, bytes other than bytes for a random number out of lower 6 bytes of the target ID are used as the input parameter for the individualization code. In FIG. 10, 2 bytes in D6 and D7 in the target ID are used as the input parameter for the individualization code. When the target ID is the encrypted ID, lower 6 bytes of the target ID are decrypted by the ID decryption section 128, and then all of the 6 bytes resulting from the decryption are used as the input parameter for the individualization code.

In the individualization code generation section 126, for example, an encryption section 126*b* regards the input parameter as a plaintext and encrypts the input parameter by using an individualization code generation key 126*a*, and an individualization code output section 126*c* outputs the encryption result.

When the input parameter is the lower 6 bytes of the card-specific ID or the lower 6 bytes of the decrypted encrypted ID, the individualization code outputted from the individualization code output section 126*c* is an individualization code (A). In contrast, when the input parameter is the lower 2 bytes of the partially-randomized ID, the individualization code is the individualization code (B).

Accordingly, when supporting both the partially-randomized ID and the encrypted ID, the IC card 200 manages both the individualization code (A) and the individualization code (B), and thus the individualization code holding section 234 holds both the individualization codes (A) and (B). On the other hand, when supporting only the encrypted ID, the IC card 200 may manage only the individualization code (A). Accordingly, the IC card 200 supporting only the encrypted ID can use only the individualization code (A) to generate an access key, so that processing thereof can be made simpler.

The individualization code thus generated is registered in advance in the IC card 200 at the time of issuing or the like of the IC card 200, and is managed by the individualization code holding section 234. In contrast in the R/W 100, every time the R/W 100 communicates with the IC card 200 located near the R/W 100, the individualization code generation section 126 generates an individualization code for the IC card 200.

Upon generation of the individualization code, the encryption processing sections 103*a* and 232*a* in FIG. 9, respectively, in the R/W 100 and the IC card 200 generate access keys, respectively. Then, by using the access key generated by the access key generation section 130, the data processing section 134 performs, through the communication section 122, a mutual authentication process with the access key generated by the access key generation section 232 of the IC card 200. If the access key generated by the access key generation section 130 coincides with the access key generated by the access key generation section 232, the mutual authentication is established, and the R/W 100 and the IC card 200 communicate with each other.

[1.6. Processing by ID Decryption Section]

Figure 14:
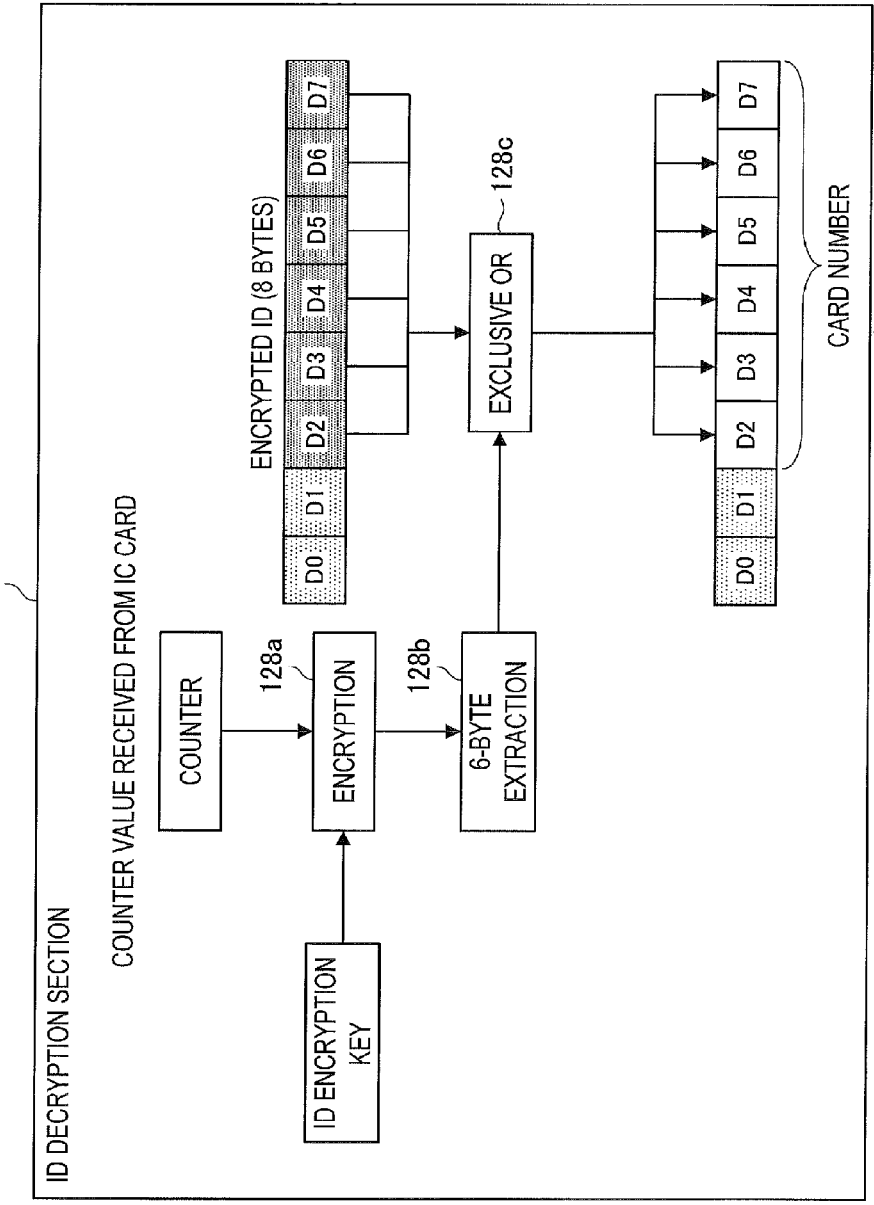
FIG. 14 is a schematic diagram illustrating processing performed by an ID decryption section.

FIG. 14 is a schematic diagram illustrating the processing performed by the ID decryption section 128. As shown in FIG. 14, the ID decryption section 128 includes an encryption section 128*a*, a 6-byte extraction section 128*b*, and an exclusive OR section 128*c*. A counter value transmitted from the IC card 200 is input to the encryption section 128*a*. The counter value received from the IC card 200 is encrypted by using the ID encryption key, and thereafter lower 6 bytes of the result of the encryption by the 6-byte extraction section 128*b* are extracted. The exclusive OR section 128*c* of the ID decryption section 128 calculates an exclusive OR of the extracted lower 6 bytes and the lower 6 bytes of the encrypted ID received from the IC card 200 to restore the card number of the card-specific ID to the original one, and outputs the card number to the individualization code generation section 126.

In FIGS. 5 and 14, the same counter value is input to the encryption section 128*a* and the encryption section 230*a*, because the counter value transmitted from the IC card 200 is input to the encryption section 128*a*. Note that although the counter value is taken as an example in the description, values to be input to the encryption section 128*a* and the encryption section 230*a*, respectively, only have to be the same value (seed value), and thus are not limited to the counter value. In addition, the ID encryption key in FIG. 5 is the same as the ID encryption key in FIG. 14, and the 6-byte extraction section 128*b* and the 6-byte extraction section 230*b* output the same value. Accordingly, by calculating the exclusive OR by the exclusive OR section 128*c* between the extracted lower 6 bytes and the lower 6 bytes of the encrypted ID received from the IC card 200, the card number of the card-specific ID can be restored to the original one. Note that although the exclusive OR is taken as an example in the description, the exclusive OR section 128*c* and the exclusive OR section 230*c* may perform another type of computation.

[1.7. Operation of Non-Contact Communication System]

Figure 11:
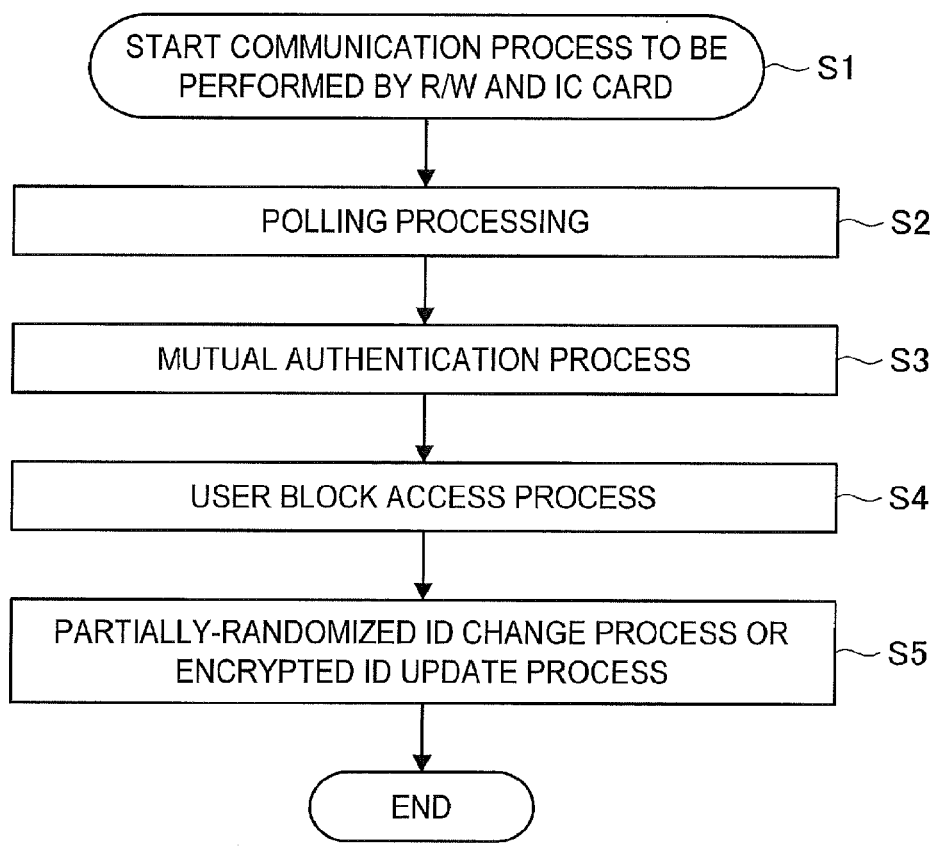
FIG. 11 is a flowchart illustrating a communication process performed by a non-contact communication system.

Next, a description is given of a communication process by the non-contact communication system according to the present embodiment. FIG. 11 is a flowchart illustrating the communication process by the non-contact communication system.

Firstly, in Step S1, the communication process between the R/W 100 and the IC card 200 is started. In subsequent Step S2, polling processing is performed. Specifically, when the R/W 100 performs the polling processing for searching for the IC card 200 which is to be a communication counterpart, the IC card 200 responding to the polling processing notifies the R/W 100 of a target ID (a partially-randomized ID, a card-specific ID, or an encrypted ID) of the IC card 200.

In Step S3, the mutual authentication process is performed. Here, the R/W 100 performs the individualization by generating an individualization code from a target ID notified of by the IC card 200 and then by applying the generated individualization code to a degeneration key, and consequently obtains an access key. In contrast, the IC card 200 performs the individualization by applying an individualization code managed by the individualization code holding section 234 to a degeneration key and consequently obtains an access key. This means that the R/W 100 and the IC card 200 obtain the same access key. Thus, the mutual authentication process is performed by using the access key.

In Step S4, a user block access process is performed. Specifically, in accordance with an instruction from a controller which is not shown, the R/W 100 performs processing of reading information recorded in the IC card 200, overwriting the information recorded in the IC card 200, or writing new information to the IC card 200.

In Step S5, a partially-randomized ID change process or the encrypted-ID update process is performed. The partially-randomized ID change process is executed by the IC card 200 in accordance with a predetermined command from the R/W 100, only when the IC card 200 is set to notify the R/W 100 of a partially-randomized ID as the target ID. Specifically, the random number generation section 228 performs the processing of updating a partially-randomized ID by changing a random number included in the partially-randomized ID as the target ID.

In addition, the encrypted ID update process is executed by the IC card 200 in accordance with a predetermined command from the R/W 100, only when the IC card 200 is set to notify the R/W 100 of the encrypted ID as the target ID. The processing of changing the encrypted ID is performed by the method described with reference to FIG. 5. In other words, the encrypted-ID generation section 230 firstly encrypts a counter value which is a plaintext by using the ID encryption key. As described above, the counter value is incremented by 1 every time the encrypted ID is generated. The encryption algorithm such as AES or DES is applicable to the encryption. Then, the 6 bytes of the encryption result are extracted, and an exclusive OR of the extracted 6 bytes and lower 6 bytes of the card-specific ID is calculated. The result of the calculation is set in D2 to D7 in the encrypted ID. Then, a system number and an IDc code which takes on a predetermined value are substituted in D0 and D1 of the encrypted ID, so that the encrypted ID update process is completed.

Note that the processing in Step S5 does not necessarily have to be executed every communication process. In other words, the R/W 100 may use the aforementioned predetermined command as necessary to cause the IC card 200 to execute the change process. After Step S5, the processing is terminated (END).

Moreover, the update process in Step S5 may be performed when the communication is started. In other words, the update process may be performed when the IC card 200 notifies the R/W 100 of its target ID in response to the polling process performed by the R/W 100 in Step S2.

Further, the update process in Step S5 may also be performed in response to input manipulation through the manipulation input section 240 performed by the user, that is, at any timing. In this case, at the timing when the manipulation input section 240 receives the input manipulation, the random number generation section 228 changes the random number included in the partially-randomized ID, or the encrypted-ID generation section 230 performs the update process for the encrypted ID.

[1.8. Operation of ID Card]

Next, a description is given in detail of processing performed by the IC card 200 in the communication process. FIG. 12 is a flowchart illustrating the processing performed by the IC card 200. The processing is started when the driving power is generated inside the IC card 200 located near the R/W 100.

Here, the NVM 206 of the IC card 200 has already held the partially-randomized ID or the encrypted ID.

Firstly, in Step S11 the processing by the IC card 200 is started. In Step S12, the communication section 222 of the IC card 200 waits for the polling from the R/W 100. When receiving the polling, the communication section 222 moves the processing to Step S13.

In Step S13, the target ID output section 224 determines the status of a target ID determination flag held by the flag holding section 226. Here, when it is determined that the target ID determination flag is in a status indicating that the partially-randomized ID is valid, the processing proceeds to Step S14, and thereafter the partially-randomized ID is notified to the R/W 100 as the target ID.

In other words, in Step S14 the target ID output section 224 reads the partially-randomized ID stored in the NVM 206 and outputs the partially-randomized ID to the communication section 222 and the access key generation section 232. Note that the description is given here on the assumption that the partially-randomized ID has been generated. However, when the partially-randomized ID has not been generated for some reason, the partially-randomized ID may be generated in Step S14.

In Step S15, the communication section 222 sends the R/W 100 the partially-randomized ID as the target ID, the partially-randomized ID being input from the target ID output section 224.

In Step S16, the access key generation section 232 causes the key management section 236 to read the degeneration key, generates an access key by applying the individualization code (B) managed by the individualization code holding section 234 to the read degeneration key, and outputs the access key to the data processing section 238.

In Step S17, the data processing section 238 performs the mutual authentication process with the R/W 100 through the communication section 222 by using the generated access key. After the mutual authentication process succeeds, the data processing section 238 performs a user block access process in Step S18. In other words, the data processing section 238 reads and writes information from and to the NVM 206 in response to a request from the R/W 100.

In Step S19, the target ID output section 224 determines whether or not the R/W 100 transmits a random number change command. When it is determined that the random number change command is transmitted, the processing proceeds to Step S20.

In Step S20, the target ID output section 224 causes the random number generation section 228 to generate a random number, and replaces a random number part of the current partially-randomized ID with the generated random number. Thereby, the target ID output section 224 regenerates the partially-randomized ID and stores the partially-randomized ID in the NVM 206. Note that the regenerated partially-randomized ID is used as the target ID to be notified from the IC card 200 to the R/W 100 in the next communication process. After the aforementioned steps, the processing by the IC card 200 is terminated.

Meanwhile, when it is determined in Step S13 that the target ID determination flag is in a status indicating that the encrypted ID is valid, the processing proceeds to Step S21, and thereafter the encrypted ID is notified to the R/W 100 as the target ID.

In other words, in Step S21 the target ID output section 224 reads the encrypted ID stored in the NVM 206 and the current counter value, and outputs the encrypted ID and the current counter value to the communication section 222 and the access key generation section 232. The current counter value is a counter value obtained at the time of generating the encrypted ID stored in the NVM 206. Note that the description is given here on the assumption that the encrypted ID has been generated. However, when the encrypted ID has not been generated for some reason, the encrypted ID may be generated in Step S21.

In Step S22, the communication section 222 sends the R/W 100 the encrypted ID as the target ID, the encrypted ID being input from the target ID output section 224. The communication section 222 sends the R/W 100 the current counter value together with the target ID.

In Step S23, the access key generation section 232 causes the key management section 236 to read the degeneration key, generates an access key by applying the individualization code (A) managed by the individualization code holding section 234 to the read degeneration key, and outputs the access key to the data processing section 238.

In Step S24, the data processing section 238 performs the mutual authentication process with the R/W 100 through the communication section 222 by using the generated access key.

After the mutual authentication process succeeds, the data processing section 238 performs the user block access process in Step S25. In other words, the data processing section 238 reads and writes information from and to the NVM 206 in response to a request from the R/W 100.

In Step S26, the target ID output section 224 determines whether or not the R/W 100 transmits an encrypted-ID change command. When it is determined that the encrypted-ID change command is transmitted, the processing proceeds to Step S27.

In Step S27, the encrypted-ID generation section 230 increments the counter value by 1 as illustrated in FIG. 5, performs the encryption process on the card-specific ID to update the encrypted ID, and stores the encrypted ID in the NVM 206. The updated encrypted ID and the counter value are recorded in the NVM 206. Note that the regenerated encrypted ID is used as the target ID to be notified from the IC card 200 to the R/W 100 in the next communication process. After the aforementioned steps, the processing by the IC card 200 is terminated.

Meanwhile, when it is determined in Step S13 that the target ID determination flag is in a state indicating that the card-specific ID is valid, the processing proceeds to Step S28, and thereafter the card-specific ID is notified to the R/W 100 as the target ID.

In other words, in Step S28, the target ID output section 224 reads the card-specific ID stored in the NVM 206 and outputs the card-specific ID to the communication section 222 and the access key generation section 232.

In Step S29, the communication section 222 sends the R/W 100 the card-specific ID as the target ID, the card-specific ID being input from the target ID output section 224.

In Step S30, the access key generation section 232 causes the key management section 236 to read the degeneration key, generates an access key by applying the individualization code (A) managed by the individualization code holding section 234 to the read degeneration key, and outputs the access key to the data processing section 238.

In Step S31, the data processing section 238 performs the mutual authentication process with the R/W 100 through the communication section 222 by using the generated access key. After the mutual authentication process succeeds, the data processing section 238 performs the user block access process in Step S32. After the aforementioned steps, the processing by the IC card 200 is terminated.

Note that in the description above, the status of the target ID determination flag is determined every time the polling is received, but this may be omitted. Instead, the partially-randomized ID, the card-specific ID, or the encrypted ID may be associated with the target ID in advance.

In addition, in the description above, when the partially-randomized ID or the encrypted ID is notified as the target ID to the R/W 100, the value generated in advance and stored in the NVM 206 is read and notified. However, every time the notification is made, the partially-randomized ID or the encrypted ID may be regenerated (updated).

[1.9. Operation of R/W]

Figure 13:
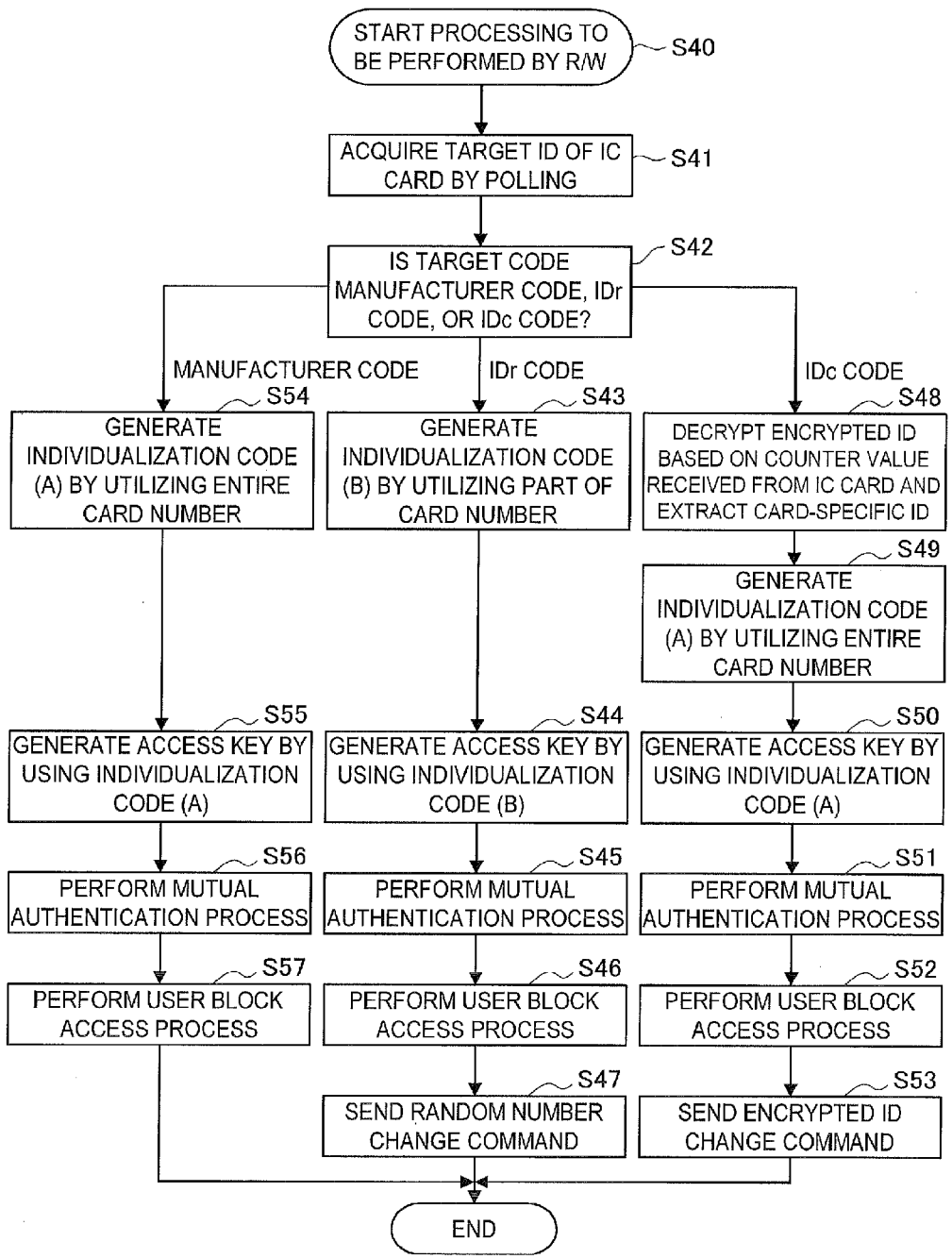
FIG. 13 is a flowchart illustrating processing performed by the R/W.

Next, a description is given in detail of processing performed by the R/W 100 in the communication process. FIG. 13 is a flowchart illustrating processing performed by the R/W 100. The processing is started in accordance with the control by the not shown controller.

In Step S40, the processing to be performed by the R/W 100 is started. In Step S41, the communication section 122 of the R/W 100 performs the polling, acquires the target ID from the IC card 200 located near the R/W 100, and outputs the acquired target ID to the target code determination section 124.

In Step S42, the target code determination section 124 determines whether the target code of the target ID is an IDr code, an IDc code, or a manufacturer code, and notifies the individualization code generation section 126 of the determination result and the target ID. Here, when it is determined that the target code is the IDr code, the processing proceeds to Step S43. In this case, the target ID notified from the IC card 200 is the partially-randomized ID.

In Step S43, the individualization code generation section 126 uses the lower 2 bytes of the card number in the target ID (the partially-randomized ID) as the input parameter for the individualization code, and generates an individualization code (B) by performing the processing in FIG. 10. The generated individualization code delivered to the access key generation section 130.

In Step S44, the access key generation section 130 causes the key management section 132 to read the degeneration key, generates an access key by applying the individualization code (B) to the read degeneration key, and outputs the access key to the data processing section 134.

In Step S45, the data processing section 134 performs the mutual authentication process with the IC card 200 through the communication section 122 by using the generated access key. After the mutual authentication process succeeds, the data processing section 134 performs a user block access process in Step S46. In other words, the data processing section 134 reads and writes information from and to the IC card 200.

In Step S47, the communication section 122 transmits a random number change command to the IC card 200. In response to the random number change command, the IC card 200 regenerates a partially-randomized ID. Note that the processing in Step S47 may be omitted. Alternatively, for example, the random number change command may be designed to be transmitted only when the communication process is performed in a predetermined time zone. After the aforementioned steps, the processing by the R/W 100 is terminated.

Meanwhile, when it is determined in Step S42 that the target code is the IDc code, the processing proceeds to Step S48. In this case, the target ID notified from the IC card 200 is the encrypted ID. The R/W 100 has received not only the encrypted ID but also the counter value.

In Step S48, the individualization code generation section 126 calls the ID decryption section 128 to decrypt the target ID and to extract the original card-specific ID. As shown in FIG. 14, the ID decryption section 128 encrypts the counter value received from the IC card 200 by using the ID encryption key, and thereafter extracts lower 6 bytes of the encryption result. The ID decryption section 128 calculates an exclusive OR of the extracted lower 6 bytes and lower 6 bytes of the encrypted ID received from the IC card 200 to restore the card number to the original one, and outputs the card number to the individualization code generation section 126.

In Step S49, the individualization code generation section 126 uses the 6 bytes forming the entire card number as the input parameter for the individualization code and generates an individualization code (A) by performing the processing in FIG. 10. The generated individualization code (A) is delivered to the access key generation section 130.

In Step S50, the access key generation section 130 causes the key management section 132 to read the degeneration key, generates an access key by applying the individualization code (A) to the degeneration key, and outputs the access key to the data processing section 134.

In Step S51, the data processing section 134 performs the mutual authentication process with the IC card 200 through the communication section 122 by using the generated access key. After the mutual authentication process succeeds, the data processing section 134 performs the user block access process in Step S52. In other words, the data processing section 134 reads and writes information from and to the IC card 200.

In Step S53, the communication section 122 transmits an encrypted-ID change command to the IC card 200. In response to the encrypted-ID change command, the IC card 200 regenerates an encrypted ID. Note that the processing in Step S53 may be omitted. Alternatively, for example, the encrypted-ID change command may be designed to be transmitted only when the communication process is performed in a predetermined time zone. After the aforementioned steps, the processing by the R/W 100 is terminated.

Meanwhile, when it is determined in Step S42 that the target code is the manufacturer code, the processing proceeds to Step S54. In this case, the target ID notified from the IC card 200 is the card-specific ID.

In Step S54, the individualization code generation section 126 uses the 6 bytes forming the entire card number of the target ID as the input parameter for the individualization code and generates the individualization code (A) by performing the processing in FIG. 10. The generated individualization code (A) is delivered to the access key generation section 130.

In Step S55, the access key generation section 130 causes the key management section 132 to read the degeneration key, generates an access key by applying the individualization code (A) to the degeneration key, and outputs the access key to the data processing section 134.

In Step S56, the data processing section 134 performs the mutual authentication process with the IC card 200 through the communication section 122 by using the generated access key. After the mutual authentication process succeeds, the data processing section 134 performs the user block access process in Step S57. In other words, the data processing section 134 reads and writes information from and to the IC card 200. After the aforementioned steps, the processing by the R/W 100 is terminated.

As described above, in the first embodiment, when the target ID determination flag held in the flag holding section 226 of the IC card 200 is set to "valid encrypted ID", the IC card 200 thereby notifies the R/W 100 of the encrypted ID as the target ID. Since the encrypted ID is seen as a completely random value from the attacker, it is not possible to track the user of the IC card 200 based on the encrypted ID.

On the other hand, the authorized service provider can decrypt the encrypted ID and thus can completely restore the card number of the card-specific ID to the original one. Thereby, not only a part of the card number but also the entire card number (6 bytes) can be used to generate a completely different individualization code (A) depending on the IC card 200. For this reason, even if the individualization code (A) of a certain one of the IC cards 200 is leaked, the individualization code (A) is not allowed to be used for the other IC cards 200. Accordingly, it is possible to prevent the security of the other IC cards 200 from being endangered. This makes it possible to achieve protecting the privacy and completely individualizing the keys, thus making it possible to considerably enhance the security of the IC cards.

Note that the information processing apparatus according to the embodiment of the present disclosure is not limited to the IC card 200 which is the present embodiment and is applicable to a mobile phone or the like with an IC chip equivalent to the IC card 200 mounted thereon.

In addition, the communication system according to the embodiment of the present disclosure is not limited to the non-contact communication system according to the present embodiment, and is applicable to any communication system in which the mutual authentication process is performed.

Moreover, the present embodiment includes the partially-randomized ID processing described in JP 2011-71758A, but the processing does not necessarily have to be performed. In this case, the target ID is limited to the two types of target IDs which are the card-specific ID and the encrypted ID.

Further, the present embodiment shows an example in which the individualization code is used as the parameter used for varying a value of an access key depending on the IC card 200. However, the parameter used for individualizing the access key is not limited to the individualization code. For example, the access key can be individualized in the following manner. Specifically, an individualized parameter is registered as a service key in a service region to which the IC card 200 belongs to, and the service key is included in the processing of generating the degeneration key. Thus, the present embodiment can be applied to another system in which the individualization code is not used.

Meanwhile, the above mentioned series of processes can be executed by hardware, or can be executed by software. In the case where the series of processes is executed by software, a program configuring this software is installed in a computer from a medium in which the program is recorded. Here, a computer incorporated into specialized hardware, and a general-purpose personal computer, which is capable of executing various functions by installing various programs, are included in the computer.

Processes of programs executed by a computer may be performed in time-series according to the description order of the above-mentioned embodiment, or may be performed in parallel or at necessary timings when called.

In addition, the processes of the programs may be performed by one computer or by a plurality of computers in a distributed manner. Further, the programs may be transferred to and executed by a remotely located computer.

In addition, the system in the specification represents the entirety of a plurality of apparatuses. The embodiment is not limited to the above-mentioned embodiment, but can be variously modified within the scope of the present disclosure.

2. Second Embodiment

[2.1. Outline of Second Embodiment]

Next, a description is given of a second embodiment of the present disclosure. In the first embodiment, the ID encryption key common to all of the IC cards 200 is stored. In this case, in the event that the ID encryption key of one of the IC cards 200 is leaked by being analyzed by an attacker, the card-specific ID can be restored from the encrypted ID of the IC card 200, and thus user privacy might be invaded.

In the second embodiment, in the event that the ID encryption key illustrated in FIG. 5 or 14 is leaked, the risk of privacy invasion to all of the IC cards 200 is inhibited. Hence, in the second embodiment, the ID encryption key is also individualized for the corresponding IC card 200. Even if the ID encryption key is leaked, the security can reliably be ensured.

[2.2. Processing by Encrypted-ID Generation Section]

Figure 15:
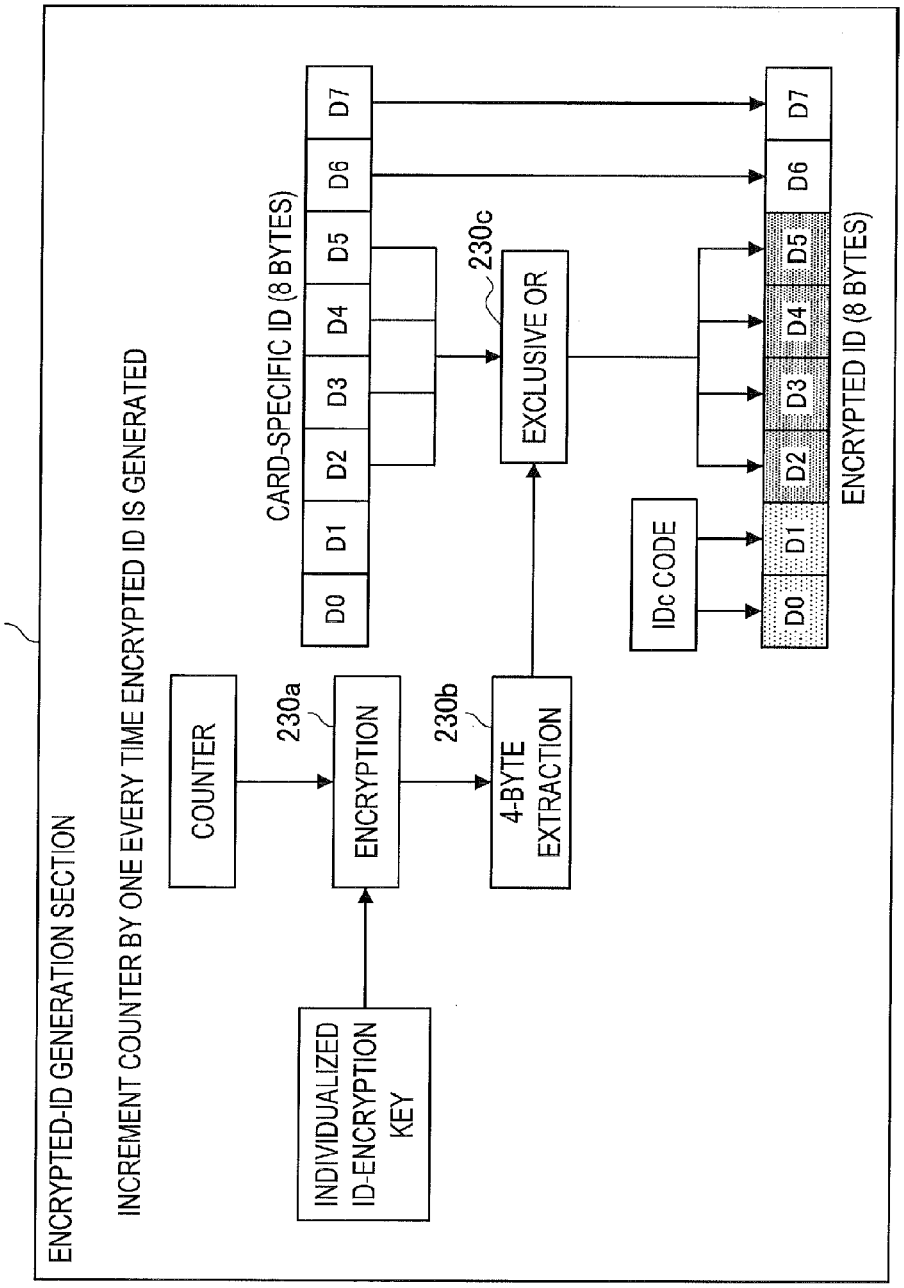
FIG. 15 is a schematic diagram illustrating processing performed by the encrypted-ID generation section of the IC card in a second embodiment.

FIG. 15 illustrates processing performed by the encrypted-ID generation section 230 of each IC card 200 in the second embodiment. The other functional blocks of the IC card 200 are the same as those in FIG. 6 in the first embodiment. A difference from the first embodiment lies in that encryption is performed by using a different individualized ID-encryption key depending on the IC card 200. The individualized ID-encryption key is registered in advance in the IC card 200, for example, at the time of issuing the IC card 200. Note that how to individualize the individualized ID-encryption key will be described later based on FIG. 16. In addition, the entire card number of the card-specific ID is not encrypted, and some bytes thereof are left without being encrypted. In the example in in FIG. 15, values of lower 2 bytes in D6 and D7 in the card-specific ID are used as a part of the encrypted ID without being encrypted.

[2.3. Processing by ID Decryption Section of R/W]

Figure 16:
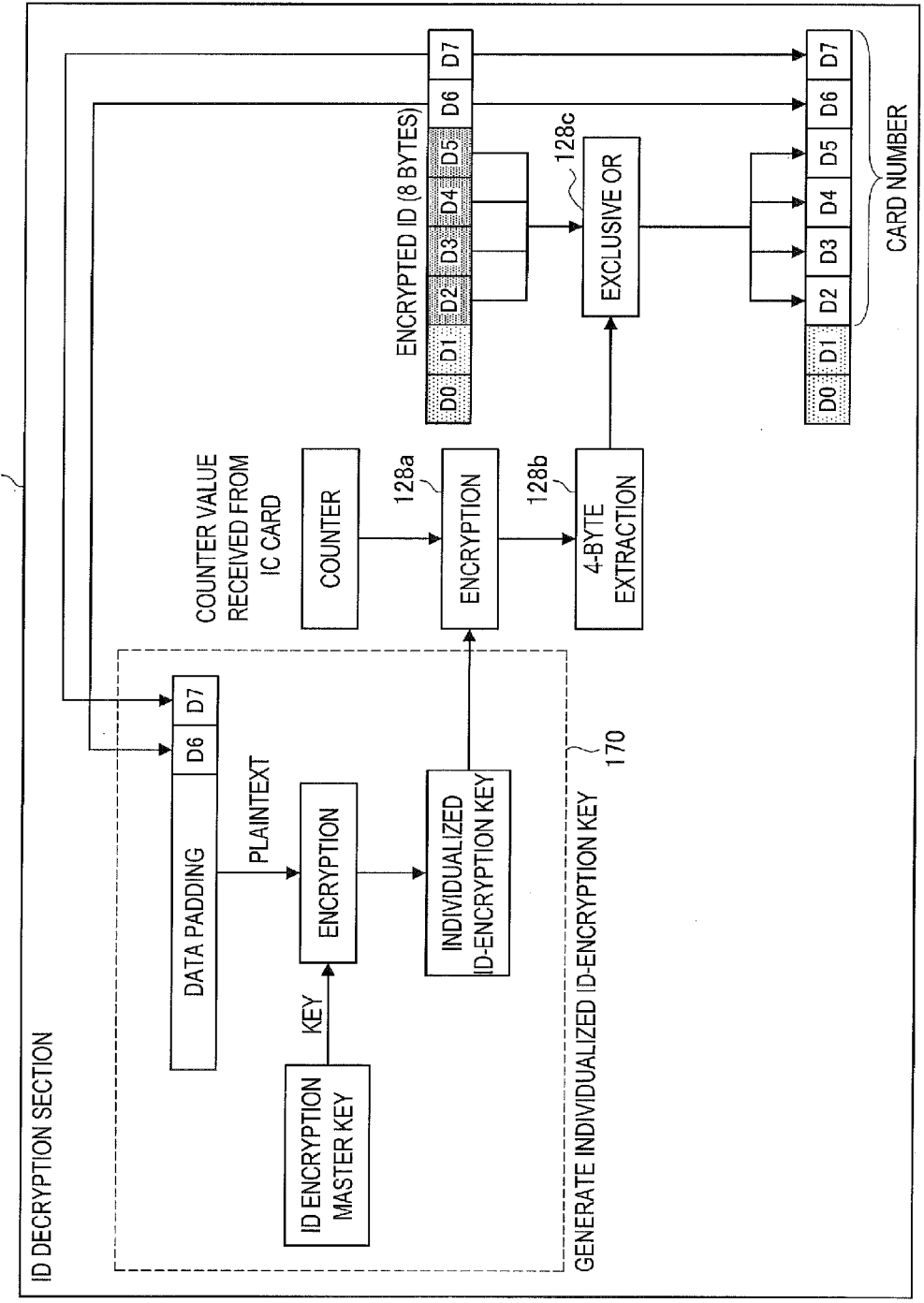
FIG. 16 is a schematic diagram illustrating processing performed by the ID decryption section of the R/W.

FIG. 16 illustrates processing by the ID decryption section 128 of the R/W 100. In the second embodiment, the other functional blocks of the R/W 100 are the same as those in FIG. 6. A difference from the first embodiment lies in processing by an individualized ID-encryption key generation section 170, the processing being surrounded by a broken line in FIG. 16. Lower 2 bytes (D6 and D7) of the encrypted ID received from the IC card 200 are not encrypted, and take on values of the corresponding part of the card-specific ID. The 2 byte data is subjected to padding by adding fixed data (for example, data having values of only 0) thereto to have a block size allowing encryption. The data as a plaintext is encrypted by using an ID encryption master key held by the R/W 100, and the encryption data is used as the individualized ID-encryption key for the IC card 200.

The IC card 200 also performs the same processing as the processing by the individualized ID-encryption key generation section 170 in FIG. 16 to generate the same individualized ID-encryption key as in FIG. 15. The individualized ID-encryption key is generated at the time of manufacturing the IC card 200 and is held by the IC card 200.

In this way, the individualized ID-encryption key set to vary depending on the IC card 200 corresponds to the individualized ID-encryption key generated in the processing by the individualized ID-encryption key generation section 170 of the R/W 100. The counter value received from the IC card 200 is encrypted by using the individualized ID-encryption key, and thereafter lower 4 bytes of the encryption result are extracted by a 4-byte extraction section 128b. The exclusive OR section 128c of the ID decryption section 128 calculates an exclusive OR of the extracted lower 4 bytes and 4 bytes (D2 to D5) of the encrypted ID received from the IC card 200 to restore the card number of the card-specific ID to the original one, and outputs the card number to the individualization code generation section 126.

[2.4. Data Structure of Encrypted ID Used in Second Embodiment]

Figure 17:
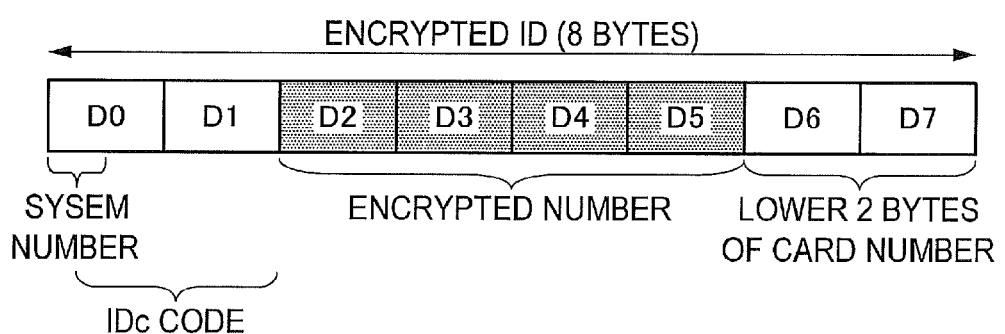
FIG. 17 is a schematic diagram illustrating data structure of an encrypted ID used in the second embodiment.

FIG. 17 illustrates a data structure of the encrypted ID used in the second embodiment. In the encrypted ID, a manufacturer code in a card-specific ID is replaced with an IDc code which takes on a predetermined value, 4 bytes of the card number is encrypted, and the lower 2 bytes of the card number of the card-specific ID are used as the lower 2 bytes of the encrypted ID.

In the event that an attacker successfully analyzes the individualized ID-encryption key of one of the IC cards 200, use of the individualized ID-encryption key individualized depending on the IC card 200 as described above makes it possible to minimize the number of encrypted IDs which can be decrypted by using the individualized ID-encryption key. In the example in FIG. 16 in which the individualized ID-encryption key is generated by using the lower 2 bytes of the card number, 65536 (2 to the sixteenth power) types of individualized ID-encryption keys can be set. Accordingly, even if the individualized ID-encryption key of one of the IC cards 200 is leaked, affection of the leakage can be reduced to one 65536-th of a case without using the individualized ID-encryption key. Accordingly, it is possible to eliminate the risk of privacy invasion to the users in the entire system.

Meanwhile, algorithm for generating the individualized ID-encryption key illustrated in FIG. 16 is merely an example. It is also possible to change the algorithm or add a parameter by using a technique known to those skilled in the art.

As described above, according to the second embodiment, the ID encryption key is made different depending on the IC card 200. In the event that the ID encryption key is leaked, it is possible to inhibit the risk of privacy invasion to all of IC cards 200.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus including
an encrypted-ID generation section which encrypts a unique ID to generate an encrypted ID, the unique ID being set as an ID unique to the information processing apparatus;
a communication section which sends the encrypted ID as ID information to be sent to another apparatus;
an individualization code holding section which holds, in advance, an individualization code capable of being generated by decrypting the ID information in the other apparatus; and
an access key generation section which generates an access key used for authentication with the other apparatus based on the individualization code held by the individualization code holding section.

(2) The information processing apparatus according to (1),
wherein the encrypted-ID generation section encrypts the unique ID by using a seed value varying depending on the encrypted ID to be generated.

(3) The information processing apparatus according to (1),
wherein the encrypted-ID generation section generates the encrypted ID based on the unique ID and encryption data generated based on an encryption key.

(4) The information processing apparatus according to (3)
wherein the encrypted-ID generation section generates the encryption data based on the encryption key and a seed value varying depending on the encrypted ID to be generated.

(5) The information processing apparatus according to (4),
wherein the communication section sends, to the other apparatus, the encrypted ID and the seed value obtained when the encrypted ID is generated.

(6) The information processing apparatus according to (1), further including:
a randomized ID generation section which randomizes at least a part of the unique ID to generate a randomized ID,
wherein the communication section sends the randomized ID as the ID information to the other apparatus.

(7) The information processing apparatus according to (6), further including:
a flag holding section,
wherein one of the encrypted ID and the randomized ID is generated based on a flag held by the flag holding section.

(8) The information processing apparatus according to (6), further including:
a manipulation input section which receives a manipulation input,
wherein one of the encrypted ID and the randomized ID is generated based on the manipulation input.

(9) The information processing apparatus according to (1),
wherein the encrypted-ID generation section generates the encrypted ID at timing at which communication with the other apparatus is started.

(10) The information processing apparatus according to (1),
wherein the encrypted-ID generation section generates the encrypted ID in response to an instruction from the other apparatus, and
wherein the information processing apparatus comprises:
a storage section which stores the generated encrypted ID.

(11) The information processing apparatus according to (3),
wherein the encryption key is individualized to correspond to at least a part of the unique ID, and
wherein the communication section sends the part of the unique ID to the other apparatus in a manner that the other apparatus generates the individualized encryption key.

(12) An IC chip including:
an encrypted-ID generation section which encrypts a unique ID to generate an encrypted ID, the unique ID being set as an ID unique to the information processing apparatus;
a communication section which sends the encrypted ID as ID information to be sent to another apparatus;
an individualization code holding section which holds, in advance, an individualization code capable of being generated by decrypting the ID information in the other apparatus; and an access key generation section which generates an access key used for authentication with the other apparatus based on the individualization code held by the individualization code holding section.

(13) The IC chip according to (12),
wherein the encrypted-ID generation section encrypts the unique ID by using a seed value varying depending on the encrypted ID to be generated.

(14) The IC chip according to (12),
wherein the encrypted-ID generation section generates the encrypted ID by using an exclusive OR of encryption data generated based on an encryption key and the unique ID.

(15) The IC chip according to (14),
wherein the encrypted-ID generation section generates the encryption data based on the encryption key and a seed value varying depending on the encrypted ID to be generated.

(16) The IC chip according to (15),
wherein the communication section sends, to the other apparatus, the encrypted ID and the seed value obtained when the encrypted ID is generated.

(17) The IC chip according to (12), further including:
a randomized ID generation section which randomizes at least a part of the unique ID to generate a randomized ID,
wherein the communication section sends the randomized ID as the ID information to the other apparatus.

(18) The IC chip according to (17), further including:
a flag holding section,
wherein one of the encrypted ID and the randomized ID is generated based on a flag held by the flag holding section.

(19) The IC chip according to (14),
wherein the encryption key is individualized to correspond to at least a part of the unique ID, and
wherein the communication section sends the part of the unique ID to the other apparatus in a manner that the other apparatus generates the individualized encryption key.

(20) An information processing method including:
encrypting a unique ID to generate an encrypted ID, the unique ID being set as an ID unique to the information processing apparatus;
sending the encrypted ID as ID information to be sent to another apparatus; and
generating an access key used for authentication with the other apparatus based on an individualization code capable of being generated by decrypting the ID information in the other apparatus.

(21) An information processing apparatus including:
a communication section which sends a response request to another apparatus and receives an encrypted ID generated by the other apparatus based on a unique ID set as an ID unique to the other apparatus;

an individualization code generation section which generates an individualization code by decrypting the encrypted ID, the individualization code being held by the other apparatus; and an access key generation section which generates an access key used for authentication with based on the individualization with the other apparatus based on the individualization code.

(22) An information processing method including:

sending a response request to another apparatus and receiving an encrypted ID generated by the other apparatus based on a unique ID set as an ID unique to the other apparatus;

generating an individualization code by decrypting the encrypted ID, the individualization code being held by the other apparatus; and generating an access key used for authentication with the other apparatus based on the individualization code.

(23) A program causing a computer to function as: means for sending a response request to another apparatus and receives an encrypted ID generated by the other apparatus based on a unique ID set as an ID unique to the other apparatus;

means for generating an individualization code by decrypting the encrypted ID, the individualization code being held by the other apparatus; and means for generating an access key used for the authentication with the other apparatus based on the individualization code.

The invention claimed is:

1. A first information processing apparatus, comprising:
a hardware processor;
circuitry configured to:
    generate an individualization code based on a card specific identifier (ID) of a communication integrated circuit (IC) card,
        wherein the generated individualization code is specific to the first information processing apparatus;
    generate an encryption key for authentication with a second information processing apparatus,
        wherein the generated individualization code is an input for the generation of the encryption key;
    generate a first encrypted ID based on an exclusive OR of a unique ID and encryption data,
        wherein the encryption data is based on the encryption key;
    generate a target ID indicator based on the generated first encrypted ID;
    transmit the generated first encrypted ID as first ID information and the generated target ID to the second information processing apparatus,
        wherein the second information processing apparatus generates the individualization code by decryption of a portion of the first ID information based on the target ID indicator;
    encrypt a seed value to generate a first encrypted value;
    calculate an exclusive OR of six bytes of the first encrypted value and lower six bytes of the first encrypted ID to generate a second encrypted value; and
    generate a second encrypted ID by replacement of the lower six bytes of the first encrypted ID with the second encrypted value.

2. The first information processing apparatus according to claim 1, wherein the unique ID is based on the seed value that is configured to vary based on the first encrypted ID.

3. The first information processing apparatus according to claim 1, wherein the circuitry is further configured to:
    generate the encryption data based on the encryption key and the seed value, wherein the seed value is configured to vary based on the first encrypted ID.

4. The first information processing apparatus according to claim 3, wherein the circuitry is further configured to:
    transmit, to the second information processing apparatus, the first encrypted ID and the seed value.

5. The first information processing apparatus according to claim 1, wherein the circuitry is further configured to:
    randomize at least a part of the unique ID to generate a randomized ID; and
    transmit the randomized ID as second ID information to the second information processing apparatus.

6. The first information processing apparatus according to claim 5, wherein one of the first encrypted ID or the randomized ID is generated based on a flag held by the circuitry.

7. The first information processing apparatus according to claim 5, wherein the circuitry is further configured to:
    receive a manipulation input,
        wherein one of the first encrypted ID or the randomized ID is generated based on the received manipulation input.

8. The first information processing apparatus according to claim 1, wherein the circuitry is further configured to:
    generate the first encrypted ID at a timing at which communication with the second information processing apparatus is started.

9. The first information processing apparatus according to claim 1,
    wherein the circuitry is further configured to generate the first encrypted ID based on an instruction from the second information processing apparatus, and
    wherein the first information processing apparatus further comprises a storage section configured to store the generated first encrypted ID.

10. The first information processing apparatus according to claim 1,
    wherein the encryption key is individualized to correspond to at least a part of the unique ID, and
    wherein the circuitry is further configured to transmit the part of the unique ID to the second information processing apparatus such that, the second information processing apparatus generates the individualized encryption key.

11. A computer implemented information processing method, comprising:
    in a first information processing apparatus:
        generating, by a hardware processor, an individualization code based on a card specific identifier (ID) of a communication integrated circuit (IC) card,
            wherein the generated individualization code is specific to the first information processing apparatus;
        generating an encryption key for authentication with a second information processing apparatus,
            wherein the generated individualization code is an input for the generation of the encryption key;
        generating a first encrypted ID based on an exclusive OR of a unique ID and encryption data,
            wherein the encryption data is based on the encryption key;
        generating a target ID indicator based on the generated first encrypted ID;

transmitting the generated first encrypted ID as ID information and the generated target ID to the second information processing apparatus, wherein the second information processing apparatus generates the individualization code by decryption of a portion of the ID information based on the target ID indicator;

encrypting a seed value to generate a first encrypted value;

calculating an exclusive OR of six bytes of the first encrypted value and lower six bytes of the first encrypted ID to generate a second encrypted value; and generating a second encrypted ID by replacement of the lower six bytes of the first encrypted ID with the second encrypted value.

* * * * *